United States Patent
Kim et al.

(10) Patent No.: US 11,055,544 B2
(45) Date of Patent: Jul. 6, 2021

(54) ELECTRONIC DEVICE AND CONTROL METHOD THEREOF

(71) Applicant: Samsung Electronics Co., Ltd., Suwon-si (KR)

(72) Inventors: Woomok Kim, Seongnam-si (KR); Unkyu Park, Seoul (KR); Hyunmi Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 107 days.

(21) Appl. No.: 16/134,501

(22) Filed: Sep. 18, 2018

(65) Prior Publication Data
US 2019/0087668 A1 Mar. 21, 2019

(30) Foreign Application Priority Data
Sep. 19, 2017 (KR) .................. 10-2017-0120279

(51) Int. Cl.
*G06K 9/00* (2006.01)
*G08G 1/0967* (2006.01)
(Continued)

(52) U.S. Cl.
CPC ....... *G06K 9/00805* (2013.01); *G06K 9/6274* (2013.01); *G08G 1/0967* (2013.01);
(Continued)

(58) Field of Classification Search
CPC .............. B60R 21/34; B60W 2420/42; B60W 2520/10; B60W 2520/14; B60W 2540/18;
(Continued)

(56) References Cited

U.S. PATENT DOCUMENTS

2014/0317560 A1* 10/2014 Hashimoto .......... G09B 29/007
715/788
2015/0339534 A1   11/2015 Morikawa et al.
(Continued)

FOREIGN PATENT DOCUMENTS

KR   10-1998-029649 A   7/1998
KR   10-2012-0071685 A   7/2012
(Continued)

OTHER PUBLICATIONS

International Search Report dated Jan. 7, 2019; International Application #: PCT/KR2018/011015.

*Primary Examiner* — Quan M Hua
(74) *Attorney, Agent, or Firm* — Jefferson IP Law, LLP

(57) ABSTRACT

An artificial intelligence (AI) system which utilizes a machine learning algorithm such as deep learning, a method therefor and an application therefor are provided. The method includes controlling an electronic device provided in a vehicle of the disclosure includes obtaining region information of a region located on a periphery of a path of the vehicle, obtaining an image by photographing a road on which the vehicle travels, through a camera, obtaining road information regarding the road on which the vehicle travels, by analyzing the obtained image, obtaining information regarding a virtual danger object which is likely to appear on the road on which the vehicle travels, based on the road information and the region information, and providing the information regarding the virtual danger object.

20 Claims, 24 Drawing Sheets

(51) Int. Cl.
*G08G 1/16* (2006.01)
*G06K 9/62* (2006.01)

(52) U.S. Cl.
CPC ............ *G08G 1/166* (2013.01); *G08G 1/167* (2013.01); *G08G 1/168* (2013.01)

(58) Field of Classification Search
CPC .. B60W 40/04; B60W 50/14; B60W 30/0956; B60W 2420/52; B60W 2420/54; B60W 2550/10; B60W 2550/402; B60W 2556/50; B60W 30/095; G06K 9/00805; G06K 9/46; G06K 9/66; G06K 9/34; G06K 9/52; G06K 9/32; G06K 9/20; G06T 7/70; G06T 7/73; G06T 7/11; G06T 7/13; G06T 7/00; G06T 7/246; G06T 7/33; G06T 7/20; G06T 7/44; G08G 1/052; G08G 1/01
See application file for complete search history.

(56) References Cited

U.S. PATENT DOCUMENTS

| | | |
|---|---|---|
| 2016/0061625 A1 | 3/2016 | Wang |
| 2016/0373715 A1 | 12/2016 | Nguyen et al. |
| 2016/0379411 A1 | 12/2016 | Harbach et al. |
| 2017/0011521 A1 | 1/2017 | Cheatham, III et al. |
| 2017/0136360 A1 | 5/2017 | Smith |
| 2017/0294139 A1* | 10/2017 | Cordova ................. G09B 7/06 |
| 2018/0233048 A1* | 8/2018 | Andersson ......... G06K 9/00805 |

FOREIGN PATENT DOCUMENTS

| | | |
|---|---|---|
| KR | 10-2016-0079497 A | 7/2016 |
| KR | 10-1661163 B1 | 9/2016 |
| KR | 10-2017-0040604 A | 4/2017 |
| KR | 10-1735080 B1 | 5/2017 |
| KR | 10-1767507 B1 | 8/2017 |
| WO | 2017/030493 A1 | 2/2017 |

* cited by examiner

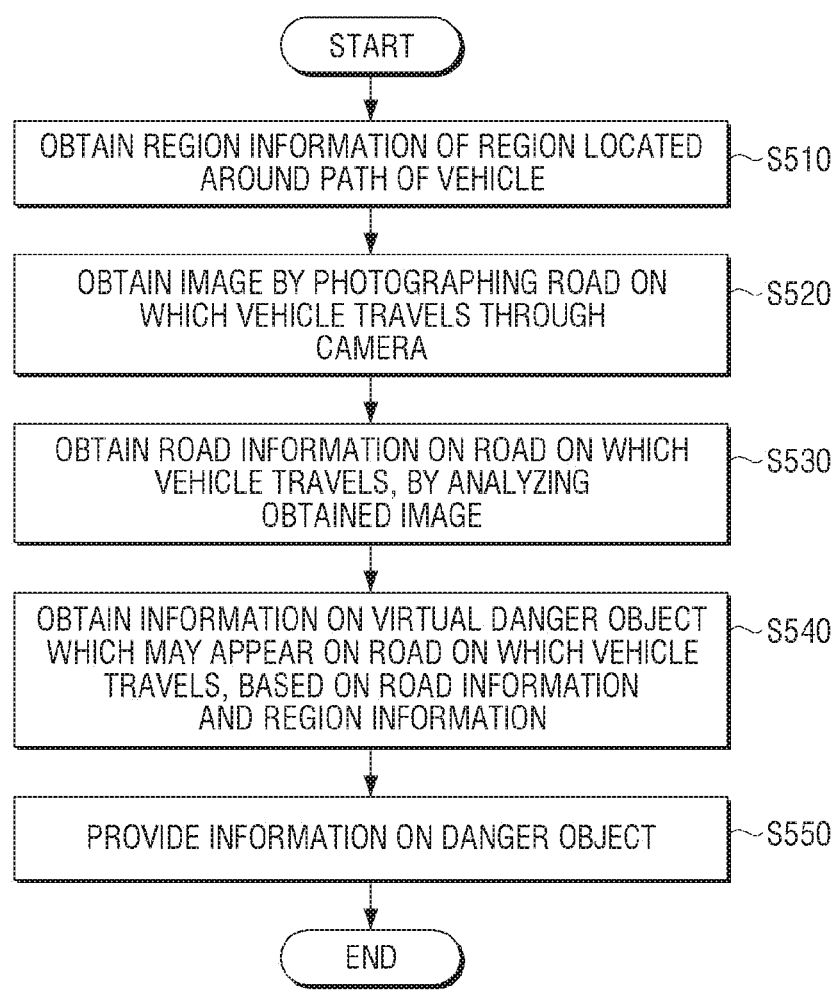

FIG. 6A

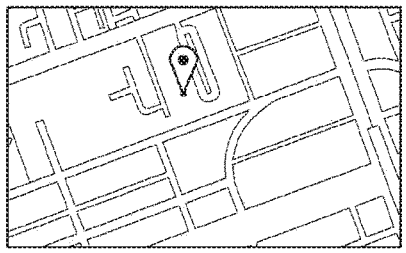

FIG. 6B

| Region Information (from Big Data/Cloud) | Population needing to be careful with safety | Children needing care from parents: 500 (5%) |
|---|---|---|
| | Rush Hour | 12:00-13:00, 15:00-15:30 |
| | Daycare center | X:38, Y:38, 300 people accommodated |
| | Middle School | X:34, Y:35, 1200 enrolled students, time of going to school/ coming home from school |
| | Traffic accidents | 20 cases/year |
| | Children traffic accidents | 5 cases/year |
| | Cause of accident | Children's running out into the road unexpectedly (3 cases: 60%) |

FIG. 6C

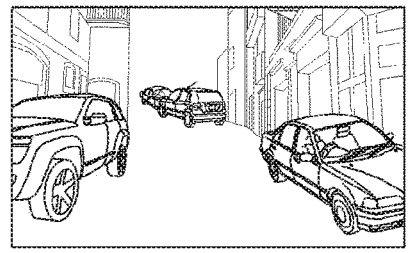

FIG. 6D 610-1  610-2   610-3 610-4

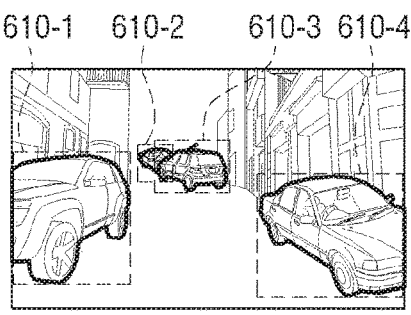

FIG. 6E 620-1     620-2  620-3

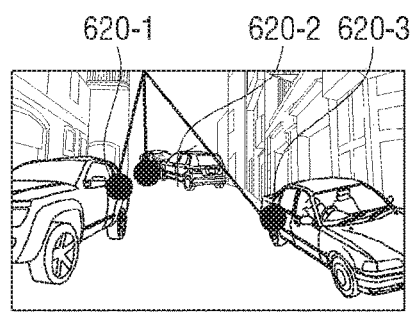

FIG. 6F

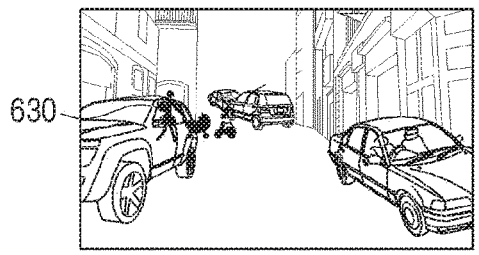

630

FIG. 7A
FIG. 7C
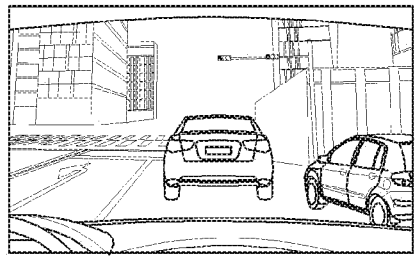
FIG. 7B
| Region Information (from Big Data/Cloud) | Motorcycle traffic | 30 motorcycles/hour |
|---|---|---|
| | Motorcycle accidents | 25 cases/year |
| | Rush hour | 10:00-18:00 |
| | Traffic accidents | 50 cases/year |
FIG. 7D
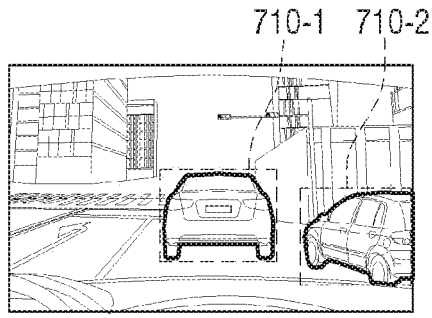
710-1  710-2
FIG. 7E
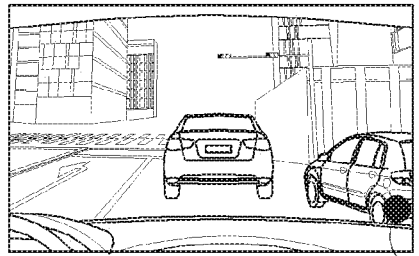
720
FIG. 7F
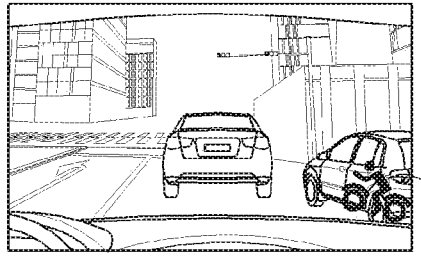
730

FIG. 8A
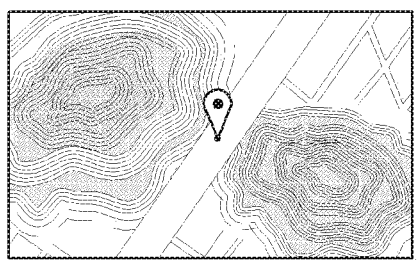
FIG. 8C
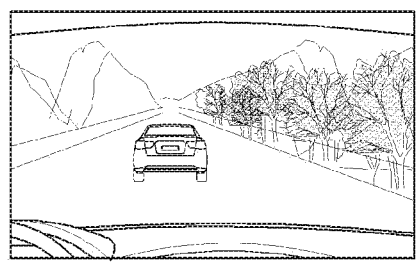
FIG. 8B
| Region Information (from Big Data/Cloud) | Inhabitants | Deer |
| --- | --- | --- |
| | Wildlife accidents | 5 cases/year |
| | Traffic accidents | 10 cases/year |
| | Wildlife detection zone | ○ |
FIG. 8D
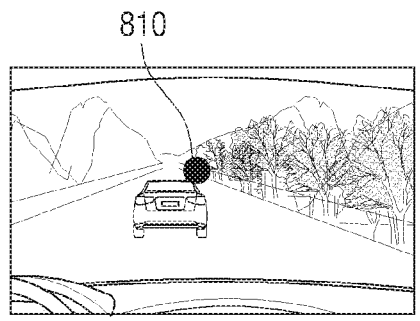
810
FIG. 8E
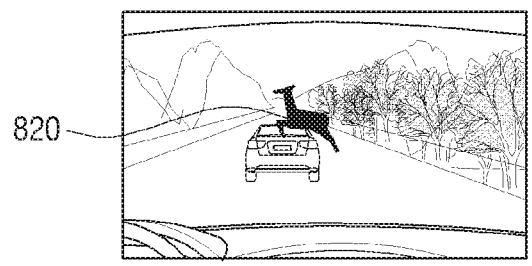
820

US 11,055,544 B2

ELECTRONIC DEVICE AND CONTROL METHOD THEREOF

CROSS-REFERENCE TO RELATED APPLICATION(S)

This application is based on and claims priority under 35 U.S.C. § 119 of a Korean patent application number 10-2017-0120279, filed on Sep. 19, 2017, in the Korean Intellectual Property Office, the disclosure of which is incorporated by reference herein in its entirety.

BACKGROUND

1. Field

The disclosure relates to an electronic device and a control method. More particularly, the disclosure relates to an electronic device which can predict a danger object which may appear on a road on which a vehicle travels, and a control method thereof.

In addition, the disclosure relates to an artificial intelligence (AI) system which copies functions of human brain, such as recognition, determination, or the like, by using a machine learning algorithm, and an application thereof.

2. Description of Related Art

The AI system refers to a computer system which implements intelligence like humans, and in which a machine learns and determines by itself, and becomes smarter unlike a related-art rule-based smart system. The AI system can enhance a recognition rate and can more exactly understand user's taste as it is used more. Therefore, the related-art rule-based smart systems are being replaced with deep-learning-based AI systems.

AI technology include machine learning (deep-learning) and element technology utilizing machine learning.

The machine learning is algorithm technology which classifies/learns characteristics of input data by itself, and the element technology is technology utilizing a machine learning algorithm such as deep learning, and includes linguistic understanding, visual understanding, inference/prediction, knowledge representation, operation control, or the like.

The AI technology may be applied to various fields as described below. The linguistic understanding is technology of recognizing human languages/characters and applying/processing, and includes natural language processing, machine translation, a dialogue system, question and answer, voice recognition/composition, etc. The visual understanding is technology for recognizing things as human eyes do, and includes object recognition, object tracking, image search, person recognition, scene understanding, space understanding, image enhancement, or the like. The inference/prediction is technology for inferring and predicting logically by determining information, and includes knowledge/probability-based inference, optimization prediction, preference-based planning, recommendation, or the like. The knowledge representation is technology for automating human experience information as knowledge data, and includes knowledge construction (data generation/classification), knowledge management (data utilization), etc. The operation control is technology for controlling autonomous driving or robot's motions, and includes motion control (navigation, collision, driving), operation control (behavior control), or the like.

A recent vehicle (for example, a car) provides a function of predicting a danger object among objects located on the periphery of the vehicle by using an image photographed by a camera, and notifying a user of the danger object. Such a function analyzes only the objects photographed by the camera, and provides information on a danger object, and thus there is a limit to notifying objects that are not photographed by the camera.

Therefore, there is a demand for a method for predicting a dangerous object that is difficult for a user to recognize, by using AI technology, and providing information to the user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for an electronic device which determines a virtual danger object which may appear on a road on which a vehicle travels, based on obtained region information and road information, and notifies a user of the virtual danger object, and a control method thereof.

Additional aspects will be set forth in part in the description which follows and, in part, will be apparent from the description, or may be learned by practice of the presented embodiments.

In accordance with an aspect of the disclosure, a method for controlling an electronic device provided in a vehicle is provided. The method includes: obtaining region information of a region located on a periphery of a path of the vehicle, obtaining an image by photographing a road on which the vehicle travels, through a camera, obtaining road information regarding the road on which the vehicle travels, by analyzing the obtained image, obtaining information regarding a virtual danger object which is likely to appear on the road on which the vehicle travels, based on the road information and the region information, and providing the information regarding the virtual danger object.

In accordance with another aspect of the disclosure, an electronic device for use in a vehicle is provided. The electronic device includes a camera, a transceiver, at least one processor electrically connected with the camera and the transceiver, and a memory electrically connected with the at least one processor, wherein the at least one processor is configured to: obtain region information of a region located on a periphery of a path of the vehicle, and store the region information in the memory, obtain an image by photographing a road on which the vehicle travels, through a camera, obtain road information regarding the road on which the vehicle travels, by analyzing the obtained image, obtain information regarding a virtual danger object which is likely to appear on the road on which the vehicle travels, based on the road information and the region information, and provide the information regarding the virtual danger object to the vehicle.

In accordance to another aspect of the disclosure, an electronic device for use in a vehicle is provided. The electronic device includes a camera, a transceiver, at least one processor electrically connected with the camera and the transceiver, and a memory electrically connected with the at least one processor. The memory is configured to store a road information recognition model which is trained to estimate road information by using an image obtained by the camera, and a danger object recognition model which is trained to estimate a virtual danger object by using road information and region information, and wherein the at least one processor is further configured to obtain region information of a region located on a periphery of a path of the vehicle, and store the region information in the memory, obtain the image by photographing a road on which the vehicle travels, through the camera, obtain the road information regarding the road on which the vehicle travels, by applying the obtained image to the road information recognition model, obtain information regarding the virtual danger object which is likely to appear on the road on which the vehicle travels, by applying the road information and the region information to the virtual danger object recognition model, and provide the information regarding the virtual danger object to the vehicle.

In accordance with an aspect of the disclosure the electronic device provides information regarding a virtual danger object that cannot be currently recognized by the user, such that an unpredicted accident can be prevented in advance.

Other aspects, advantages, and salient features of the disclosure will become apparent to those skilled in the art from the following detailed description, which taken in conjunction with the annexed drawings, discloses various embodiments of the disclosure.

BRIEF DESCRIPTION OF THE DRAWING

The above and other aspects, features, and advantages of certain embodiments of the disclosure will be more apparent from the following description taken in conjunction with the accompanying drawings, in which:

FIG. 5 is a flowchart to illustrate a method for providing a danger object in an electronic device according to an embodiment of the disclosure;

FIGS. 6A, 6B, 6C, 6D, 6E, 6F, 7A, 7B, 7C, 7D, 7E, 7F, 8A, 8B, 8C, 8D and 8E are views to illustrate a method for providing a danger object in an electronic device according to various embodiments of the disclosure;

Throughout the drawings, like reference numerals will be understood to refer to like parts, components, and structures.

DETAILED DESCRIPTION

Figure 1A:
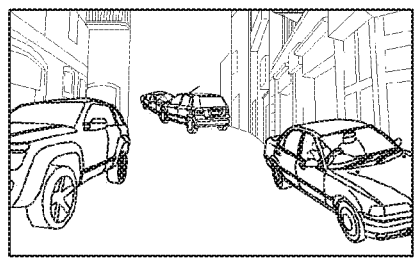
FIGS. 1A and 1B are views illustrating providing information regarding a virtual danger object in an electronic device according to various embodiments of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "have", "may have", "include", and "may include" used in the embodiments of the disclosure indicate the presence of corresponding features (for example, elements such as numerical values, functions, operations, or components), and do not preclude the presence of additional features.

The terms "A or B," "at least one of A or/and B," or "one or more of A or/and B" used in the embodiments of the disclosure include all possible combinations of the associated listed items. For example, the term "A or B," "at least one of A and B," or "at least one of A or B" may refer to all of the case (1) where at least one A is included, the case (2) where at least one B is included, or the case (3) in which both of at least one A and at least one B are included.

As used herein, such terms as "$1^{st}$" and "$2^{nd}$" or "first" and "second" may be used to modify various components regardless of order and/or importance, and may be used to simply distinguish a corresponding component from another, and do not limit the components.

It will be understood that when an element (for example, a first element) is "(operatively or communicatively) coupled with/to" or "connected with" another element (for example, a second element), the element may be directly coupled with/to another element, and there may be an intervening element (for example, a third element) between the element and another element. To the contrary, it will be understood that when an element (for example, a first element) is "directly coupled with/to" or "directly connected to" another element (for example, a second element), there is no intervening element (for example, a third element) between the element and another element.

The expression "configured to (or set to)" used in various embodiments of the disclosure may be replaced with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or components in a certain context. For example, "a processor configured to (set to) perform A, B, and C" may mean a dedicated processor (e.g., an embedded processor) for performing a corresponding operation, or a generic-purpose processor (e.g., a CPU or an application processor) capable of performing a corresponding operation by executing one or more software programs stored in a memory device.

An electronic device according to an embodiment may be implemented by using a portion of a vehicle or an external device mounted in a vehicle.

When the electronic device is an external device mounted in a vehicle, the electronic device may be a driver assist device such as on board diagnostics (OBS) coupled to a connector for a vehicle (for example, an OBD terminal or an OBD connector), a navigation device, or the like, or may be a portion thereof.

When the electronic device is a portion of a vehicle, the electronic device may be, for example, an advanced driver assist system (ADAS), or a portion of the system. Alternatively, the electronic device may be an electronic control unit (ECU) for electronically controlling various functions related to an operation of the vehicle, or may be a portion of the unit.

In addition, the electronic device may be a smartphone, a tablet personal computer (PC), a mobile phone, a video phone, an e-book reader, a desktop PC, a laptop PC, a netbook computer, a personal digital assistant (PDA), a portable multimedia player, an MP3 player, a mobile medical device, a camera, Internet of Things (IoT), or a wearable device, which is a portable terminal device, or a portion of these. In this case, when the electronic device is implemented by using a portable terminal device, the electronic device may be connected with a vehicle through various interfaces.

In the disclosure, the vehicle may be a device on which a person rides or a cargo is loaded, and which can be moved, and for example, may include a vehicle, an airplane, a motorcycle, a ship, a train, or the like.

Figure 1B:
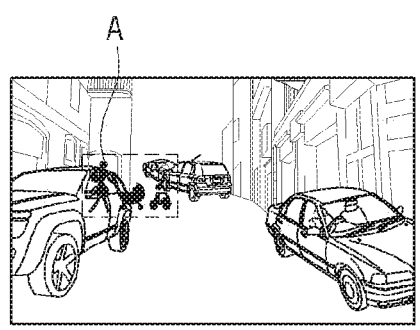

FIGS. 1A and 1B are views to illustrate a scenario in which an electronic device provides information on a virtual danger object according to an embodiment of the disclosure.

Referring to FIGS. 1A and 1B, the electronic device 100 may obtain and store region information of a region where a vehicle provided with the electronic device 100 is located. In this case, the region information may be, but not limited to, demographic information of the region, information on school/private educational institutes of the region, information on traffic accidents having occurred in the region, information on wildlife appearance of the region, information on danger object appearance having occurred in other vehicles, and may include a variety of information such as hospital information, restaurant information, or the like.

In particular, when the user sets a path through a navigation device, the electronic device 100 may obtain region information of a region where the user will be located, in advance, based on the path set by the user. In another example, the electronic device 100 may identify a current location through a global positioning system (GPS) sensor, and may obtain region information of a region within a predetermined range, in advance, based on the current location. In this case, the electronic device 100 may update the current location when the electronic device 100 is out of the predetermined range or before the electronic device 100 is out of the predetermined range, and may obtain region information of a region in a new range, in advance, based on the updated current location.

The electronic device 100 may photograph a road on which the vehicle travels through a camera, or may obtain an image as shown in FIG. 1A. In this case, the electronic device 100 may obtain an image on a front area of the vehicle through the camera, but this is merely an example, and may obtain an image regarding a side area or a rear area of the vehicle. In addition, the electronic device 100 may obtain the image by using a camera included in the vehicle or a camera included in an external device (for example, a dash camera) provided separately from the electronic device 100.

The electronic device 100 may obtain road information regarding the road on which the vehicle travels, by analyzing the obtained image. Specifically, the electronic device 100 may detect at least one object included in the obtained image by analyzing the obtained image. In this case, the at least one detected object may be at least one of a vehicle, a motorcycle, a bicycle, a sign, a traffic light, a building, a sign board, a pedestrian, or an animal, but this is merely an example, and may also include other objects for obtaining road information. In this case, the electronic device 100 may detect the at least one object by inputting the image to an object recognition model which is trained to estimate an object.

In addition, the electronic device 100 may obtain the road information of the road on which the vehicle travels, based on the at least one detected object. In this case, the road information is information regarding the road on which the vehicle currently travels, or information regarding a state of an object included in the road, and may include arrangement information of the object, movement information of the object, blind spot information included in the road, state information of the road, or the like. In particular, the electronic device may obtain the road information of the road on which the vehicle travels, by inputting the detected object information to a road information recognition model which is trained to estimate road information. Although the electronic device 100 detects the object by analyzing the image, and obtains the road information based on the detected object in the above-described embodiment, this is merely an example. The electronic device 100 may directly obtain the road information by inputting the obtained image to the road information recognition model trained to estimate road information.

The electronic device 100 may obtain information regarding a virtual danger object (hereinafter, referred to as a "danger object") which may appear on the road where the vehicle travels, based on the road information and the region information. Specifically, the electronic device 100 may calculate a probability that a danger object appears, based on the region information (for example, demographic information, traffic accident information, or the like) and the road information (for example, blind spot information, vehicle movement speed information, or the like). In addition, when the probability that the danger object appears is higher than or equal to a predetermined value, the electronic device 100 may obtain information regarding the danger object, based on the region information (for example, demographic information, traffic accident information, or the like) and the road information (for example, blind spot information, vehicle movement speed information, or the like). In this case, the information regarding the danger object may include type information of the danger object, information regarding a location in which the probability of the appearance of the danger object is high, speed information of the danger object, or the like. In particular, the electronic device 100 may obtain the information regarding the danger object by inputting the road information and the region information to a danger object recognition model which is trained to estimate a danger object.

The electronic device 100 may provide the information regarding the danger object. Specifically, the electronic device 100 may provide the information of the danger object by providing acoustic feedback through a speaker, providing visual feedback through a display, or providing haptic feedback through a vibration device. In this case, the speaker, the display, and the vibration device may be provided in the electronic device 100, but this is merely an example, and may be provided in the vehicle or another device provided in the vehicle. For example, the speaker may be implemented by using a speaker provided in the vehicle, the display may be implemented by using a display (for example, a head up display (HUD)) provided in the vehicle, and the vibration device may be implemented by using a vibration device provided in a driver seat or a steering wheel of the vehicle.

In particular, the electronic device 100 may generate and display an indicator A corresponding to the danger object as shown in FIG. 1B. In this case, the indicator A may have a shape corresponding to the type of the danger object, and may be displayed on a location in which the probability of the appearance of the danger object is high. In addition, the indicator A may be an animated (or simplified) image to be distinguished from a real object.

In addition, the electronic device 100 may transmit a control command for controlling driving of the vehicle based on the information regarding the danger object. For example, the electronic device 100 may transmit a deceleration command, a stop command, a detour command, or the like to the vehicle according to the type, location, speed, or the like of the danger object. In addition, when the electronic device 100 is implemented by using a portion of the vehicle, the electronic device 100 may control driving of the vehicle based on the information regarding the danger object.

The above-described various recognition models may be recognition model which are trained based on artificial intelligence, and for example, may be models based on a neural network. The object recognition model may be designed to simulate the human brain structure on a computer, and may include a plurality of network nodes having weights, for simulating a neuron of a human neural network. The plurality of network nodes may establish their respective connection relationships to simulate a synaptic activity of the neuron exchanging signals through a synapse. In addition, the object recognition model may include, for example, a neural network model or a deep learning model which is developed from the neural network model. In the deep learning model, the plurality of network nodes may be located at different depths (or layers), and may exchange data with one another according to a convolution connection relationship. Examples of the object recognition model may include a deep neural network (DNN), a recurrent neural network (RNN), a bidirectional recurrent deep neural network (BRDNN), or the like, but are not limited thereto.

In addition, the electronic device 100 may use an AI agent to provide the danger object based on the region information and the road information as described above. In this case, the AI agent is a dedicated program for providing AI-based services (for example, a voice recognition service, a secretary service, a translation service, a search service, or the like), and may be implemented by using a generic-purpose processor (for example, a CPU), or a separate AI-dedicated processor (for example, a graphics processing unit (GPU)). In particular, the AI agent may control various modules which will be described below.

Specifically, when the electronic device 100 or the vehicle enters a safety driving mode or an autonomous driving mode, the electronic device 100 may operate the AI agent. In this case, the AI agent may predict a danger object by using various recognition models and modules, and may provide information regarding the danger object.

Figure 2A:
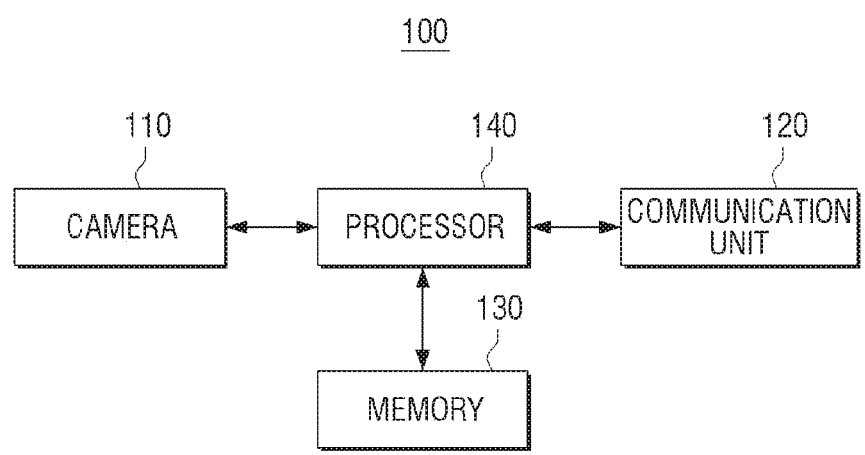
FIGS. 2A, 2B and 3 are block diagrams illustrating a configuration of an electronic device according to various embodiments of the disclosure.

FIG. 2A is a block diagram schematically illustrating a configuration of an electronic device according to an embodiment of the disclosure.

Referring to FIG. 2A, The electronic device 100 includes a camera 110, a communication unit 120, a memory 130, and a processor 140. The elements illustrated in FIG. 2A are examples for implementing embodiments of the disclosure, and appropriate hardware/software elements obvious to a person skilled in the art may be additionally included in the electronic device 100.

The camera 110 may obtain an image by photographing a road on which the vehicle travels. In this case, the camera 110 may be disposed on a front surface of the vehicle, and may photograph a front area of the road on which the vehicle travels. However, this is merely an example. The camera 110 may be disposed on a rear surface of the vehicle, and may photograph a rear area of the road on which the vehicle travels, or may be disposed on a side surface of the vehicle and may photograph a side area of the road on which the vehicle travels. In this case, the camera 110 may be provided in the electronic device 100, but this is merely an example. The camera 110 may be provided in the vehicle, and may be connected with the electronic device 100 wiredly or wirelessly.

In this case, the camera 110 may be a camera for obtaining a color image. However, the camera 110 may be implemented by using various cameras such as a depth camera for obtaining a depth image, or the like.

The communication unit 120 may exchange a variety of information by communicating with an external server or an external device. In this case, the communication unit 120 may receive region information of a region in which the vehicle is currently located, from the external server. In addition, the communication unit 120 may receive a beacon signal including traffic guidance information from an external traffic guidance device. In addition, the communication unit 120 may transmit information regarding the current vehicle and user information to the external server.

In addition, the communication unit 120 may communicate with various types of external devices according to various types of communication methods. The communication unit 120 may include at least one of a Wi-Fi chip, a Bluetooth chip, a wireless communication chip, a near field communication (NFC) chip. The processor 140 may communicate with the external server or various external devices by using the communication unit 120.

The memory 130 may store a command or data related to at least one other element of the electronic device 100. In particular, the memory 130 may be implemented by using a nonvolatile memory, a volatile memory, a flash memory, a hard disk drive (HDD), or a solid state drive (SSD). The memory 130 may be accessed by the processor 140, and may perform reading/recording/correcting/deleting/updating by means of the processor 140. In the disclosure, the term "memory" may include the memory 130, a read only memory (ROM) (not shown) in the processor 140, a random access memory (RAM) (not shown), or a memory card (not shown) mounted in the electronic device 100 (for example, a micro SD card, a memory stick). In addition, the memory 130 may store programs and data for configurating various screens to be displayed on a display region of a display 170.

In addition, the memory 130 may store region information of a region in which the vehicle is currently located. In this case, the region information may include demographic information of the corresponding region, information on school/private educational institutes of the corresponding region, information on car accidents having occurred in the corresponding region, information on wildlife appearance of the corresponding region, or the like. In this case, when the location of the vehicle is changed, the memory 130 may update the region information with reference to a changed location of the vehicle under control of the processor 140.

In addition, the memory 130 may store the AI agent to provide information related to a selected object. The memory 130 may store the recognition models of the disclosure (an object recognition model 370, a road information recognition model 380, a danger object recognition model 390, or the like). Although the memory 130 stores the recognition model in an embodiment, this is merely an example, and an external data recognition server may store at least one of the plurality of recognition models.

Figure 3:
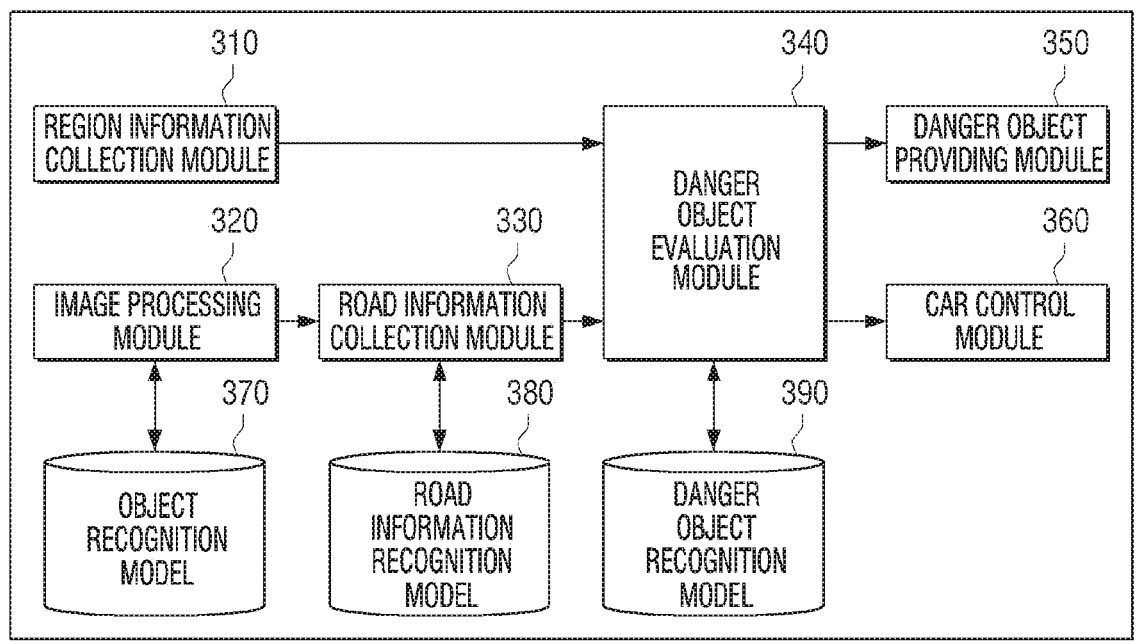

In addition, the memory 130 may store a region information collection module 310, an image processing module 320, a road information collection module 330, a danger object evaluation module 340, a danger object providing module 350, and a car control module 360, which are illustrated in FIG. 3.

Specifically, the region information collection module 310 may collect region information from an external server through the communication unit 120. In particular, the region information collection module 310 may collect region information based on a location detected through a GPS sensor 150. Alternatively, the region information collection module 310 may determine a current location based on information of a base station connected with the communication unit 120, and may collect region information with reference to the determined location.

In addition, when path information of the vehicle is pre-set, the region information collection module 310 may collect region information in advance based on the pre-set path. Alternatively, the region information collection module 310 may update the location at predetermined time intervals, and may receive region information with reference to the updated location.

The region information collection module 310 may obtain region information from an external traffic guidance device. For example, the region information collection module 310 may determine whether the current location is a children protection zone or a wildlife detection zone through the external traffic guidance device.

After receiving information regarding the region from the external server, the region information collection module 310 may collect only necessary region information of the received information. For example, the region information collection module 310 may receive a variety of information as big data, but may extract and collect only information necessary for predicting a danger object, such as population proportion information of the current region, traffic accident information, or the like.

The image processing module 320 may process the image obtained by the camera 110. In this case, the image processing module 320 may perform pre-processing to recognize an object included in the image. In addition, the image processing module 320 may recognize an object included in the image by using the object recognition model 370. In this case, the object recognition model 370 is a recognition model that is trained to recognize an object included in an image, and an object may be extracted by inputting an image to the trained recognition model. In this case, the object recognition model 370 may use an object recognition model, such as a DNN, an RNN, a BRDNN, or the like.

The road information collection module 330 may collect road information regarding the road on which the vehicle currently travels, by using object information. In this case, the road information may be arrangement information of an object included in the road, movement information of the object, blind spot information included in the road, state information of the road, or the like. In this case, the road information collection module 330 may collect the road information by using the road information recognition model 380 as shown in FIG. 3. The road information recognition model 380 is a recognition model that is trained to obtain road information, and road information may be obtained by inputting object information (for example, a type of an object, a location, or the like). In this case, the road information recognition model 380 may also use the object recognition model, but is not limited thereto.

Although the object recognition model 370 and the road information recognition model 380 are implemented as separate recognition models in FIG. 3, this is merely an example. The road information may be obtained by using one recognition model. That is, the road information may be directly obtained by inputting the obtained image to the recognition model.

The danger object evaluation module 340 may predict a probability that a danger object appears, based on the region information outputted from the region information collection module 310 and the road information outputted from the road information collection module 330, and may obtain information regarding the danger object.

Specifically, the danger object evaluation module 340 may calculate the probability that danger information appears based on the region information and the road information. Specifically, the danger object evaluation module 340 may calculate the probability that the danger information appears, based on a population proportion or a traffic accident rate of the region information. In addition, the danger object evaluation module 340 may calculate the probability that the danger information appears, based on an arrangement state of the object included in the current road, a moving state, and presence/absence of a blind spot.

In addition, the danger object evaluation module 340 may calculate the probability that the danger object appears, by additionally using at least one of current time information and additional information regarding a similar road registered as being similar to the road on which the vehicle is currently located. In addition, the danger object evaluation module 340 may calculate the probability that the danger object appears, by additionally using traffic guidance information regarding the road, received from a traffic guidance device located on the road on which the vehicle travels, through the communication unit 120. In addition, the danger object evaluation module 340 may calculate the probability that the danger object appears, based on history information regarding user's driving habits, stored in the memory 130. In this case, the history information may include an average speed, a brake operation ratio, a traffic signal violation ratio, preferred path information in the corresponding region.

When the calculated probability value is higher than or equal to a predetermined value, the danger object evaluation module 340 may obtain information regarding a predicted danger object. In this case, the information regarding the danger object may include a type of the danger object, a location in which the probability of the appearance of the danger object is high, a moving speed of the danger object, or the like.

In addition, the danger object evaluation module 340 may obtain the information regarding the danger object by using the danger object recognition model 390 as shown in FIG. 3. In this case, the danger object recognition model 390 is a recognition model that is trained to obtain information regarding a danger object, and information regarding a danger object may be obtained by inputting road information and region information.

The danger object providing module 350 provides the information regarding the danger object by using a variety of feedback. Specifically, the danger object providing module 350 may provide the information regarding the danger object through visual feedback, acoustic feedback, or haptic feedback. For example, the danger object providing module 350 may provide an indicator A corresponding to the danger object to be displayed on the display, may provide a guidance audio corresponding to the danger object to be outputted through the speaker, or may provide a vibration corresponding to the danger object through a vibration device included in a driver's seat or a steering wheel held by the driver.

In addition, the danger object providing module 350 may provide a variety of information regarding the danger object. Specifically, the danger object providing module 350 may provide such information as a type of the danger object, a location of the danger object, a moving pattern of the danger object, or the like. For example, the danger object providing module 350 may provide a guidance audio saying "Watch out for children appearing on blind spots."

The car control module 360 may generate a control command for controlling driving of the car based on the information regarding the danger object. Specifically, the car control module 360 may generate a control command for controlling a speed or a direction of the vehicle according to the danger object. For example, the car control module 360 may generate a deceleration command, a stop command, a turn command, or the like according to the danger object.

The plurality of modules 310 to 360 illustrated in FIG. 2 are stored in the memory 130 of the electronic device 100, but this is merely an example. At least one of the plurality of modules 310 to 360 may be provided in the vehicle 10 or an external server.

Referring back to FIG. 2A, the processor 140 are electrically connected with the camera 110, the communication unit 120, and the memory 130 to control overall operations and functions of the electronic device 100. In particular, the processor 140 may predict a danger object by using the region information collection module 310, the image processing module 320, the road information collection module 330, the danger object evaluation module 340, the danger object providing module 350, the car control module 360, and the plurality of recognition models, as shown in FIG. 3, and may provide information regarding the danger object.

Specifically, the processor 140 may receive region information of a region located around the path of the vehicle through the communication unit 120, and may store the region information in the memory 130. In addition, the processor 140 may obtain an image by photographing the road on which the vehicle travels, through the camera 110, and may obtain road information regarding the road on which the vehicle travels, by analyzing the obtained image. In addition, the processor 140 may obtain information regarding a virtual danger object which may appear on the road on which the vehicle travels, based on the road information and the region information, and may provide the information regarding the danger object to the vehicle.

In particular, the processor 140 may receive region information of the region located around the path of the vehicle in advance through the communication unit 120, and may store the region information in the memory 130. In this case, the region information may include demographic information of the region, information on school/private educational institutes of the region, information on car accidents having occurred in the region, information on wildlife appearance of the region, but is not limited thereto.

The processor 140 may obtain an image through the camera 110 and may obtain road information based on the obtained image. Specifically, the processor 140 may obtain at least one of arrangement information of an objected included in the road on which the vehicle travels, movement information of the object, blind spot information included in the road, and state information of the road, by inputting the image to a recognition model which is trained to estimate road information.

In addition, the processor 140 may obtain information regarding a danger object which is highly likely to appear on the road, on which the vehicle travels, based on the road information and the region information. In this case, the information regarding the virtual danger information may be information that is obtained by applying the road information and the region information to a recognition model which is trained to estimate a danger object. In this case, the information on the virtual danger object may include at least one of type information of the danger object, information on a location where the virtual danger object appears, and moving pattern information of the virtual danger object.

The processor 140 may obtain the information regarding the danger object by using current time information and additional information regarding a similar road registered as being similar to the road, in addition to the road information and the region information. Specifically, the processor 140 may calculate the probability that the danger object appears by additionally using the current time information (for example, time of going to school/coming home from school, nighttime or daytime), and may calculate the probability that the danger object appears by additionally using the additional region information regarding the similar road registered as being similar to the road. That is, the processor 140 may calculate the probability that the danger object appears by additionally using additional region information of another region having a road structure and a building structure similar to those of the current road.

In addition, when traffic guidance information regarding the road is received from a traffic guidance device located on the road on which the vehicle travels, through the communication unit 120, the processor 140 may obtain the information regarding the danger object by additionally using the traffic guidance information. For example, when traffic guidance information such as "children protection zone," "wildlife detection zone," or the like is received from the traffic guidance device, the processor 140 may obtain the information regarding the danger object by using the traffic guidance information along with the road information and the region information.

In addition, the processor 140 may obtain the information regarding the danger object by additionally using history information regarding driver's driving habits stored in the memory 130. Specifically, when an average speed of the user driving on a road on which children frequently appear exceeds a predetermined value, the processor 140 may calculate a high probability of appearance of a danger object.

In addition, the processor 140 may output a control command to the vehicle to output the information regarding the danger object through a speaker provided in the vehicle, or to display the danger object through a display provided in the vehicle. Alternatively, the processor 140 may directly output the information regarding the danger object through the display 170 and a speaker 180 provided in the electronic device 100.

In addition, the processor 140 may transmit a control command to the vehicle to control driving of the vehicle based on the information regarding the danger object. In this case, the processor 140 may transmit the control command through a connector or an interface connected with the vehicle. In addition, the processor 140 may be implemented by using an ECU of the vehicle, and may directly control the driving of the vehicle.

In addition, the processor 140 may obtain information regarding whether the danger object really appears, and may control the communication unit 120 to transmit the obtained result to the server storing the region information. Specifically, when the virtual danger object really appears, the processor 140 may control the communication unit 120 to transmit information regarding the really appearing danger object, current location information, or the like to the external server. In this case, the information regarding the real danger object transmitted may be used as region information for predicting a virtual danger object in another vehicle.

Figure 2B:
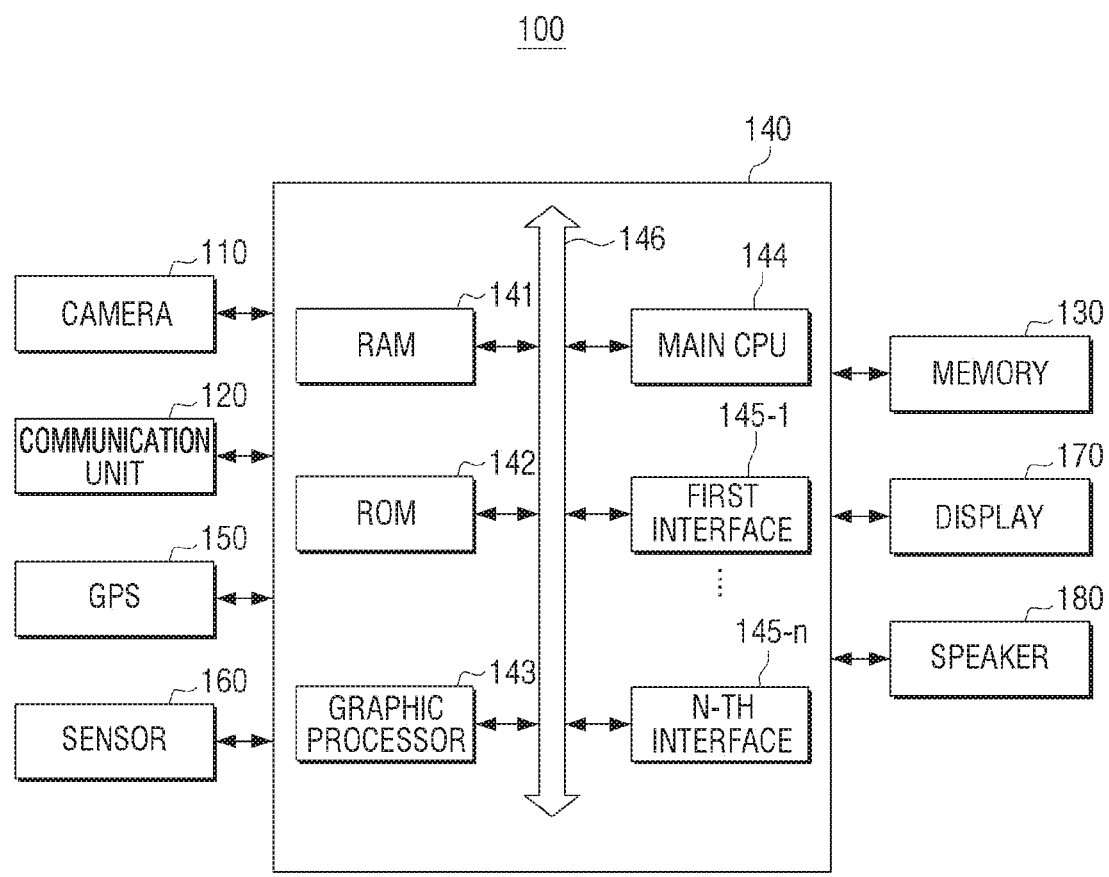

FIG. 2B is a block diagram illustrating the configuration of the electronic device 100 in detail according to an embodiment of the disclosure.

Referring to FIG. 2B, the electronic device 100 may include the camera 110, the communication unit 120, the memory 130, the processor 140, the GPS 150, a sensor 160, the display 170, and the speaker 180. The camera 110, the communication unit 120, the memory 130, and the processor 140 have been described in FIG. 2A, and a redundant explanation thereof is omitted.

The GPS 150 is an element for receiving a GPS signal from a GPS satellite, and calculating a current location of the vehicle including the electronic device 100.

The sensor 160 may detect a surrounding environment of the vehicle including the electronic device 100, a user interaction, or a state change. In this case, the sensor 160 may transmit a detected sensing value or information derived based on the sensing value to the processor 140.

The sensor 160 may include various sensors. For example, the sensor 160 may include a proximity sensor to detect proximity of other vehicles, pedestrians, or animals. Alternatively, the sensor 160 may include various sensors, such as a sensor to detect a user interaction (for example, a touch sensor, a pen detection sensor), a sensor for detecting motion information of the vehicle (for example, an acceleration sensor, a gyro sensor), a sensor for detecting an ambient state of the electronic device 100 or the vehicle (for example, an illuminance sensor, a noise sensor (for example, a microphone)), or the like.

The display 170 may provide various screens. In particular, the display 170 may display an indicator corresponding to a danger object. In this case, the display 170 may display the indicator on a road image currently obtained by the camera 110.

The display 170 may output image data to a display region exposed on one surface of a housing of the electronic device 100. In this case, at least a portion of the display 170 may be coupled to at least one of a front surface area, a side surface area, and a rear surface area of the electronic device 100 in the form of a flexible display.

The display 170 may be coupled to a touch panel to be implemented as a touch screen of a layer structure. The touch screen may have not only a display function but also a function of detecting a touch input force as well as a touched area, and also may have a function of detecting not only a real touch but also a proximity touch.

In addition, the display 170 may be implemented by using a display such as a normal liquid crystal display (LCD), an organic light emitting diode (OLED), or the like, but this is merely an example, and the display 170 may be implemented by using a HUD in the vehicle.

The speaker 180 may output audio data. In particular, the speaker 180 may output a guidance audio including information regarding a danger object. In this case, the speaker 180 may be included in the electronic device 100, but this is merely an example, and the speaker 180 may be electrically connected with the electronic device 100 and may be installed in the vehicle.

The processor 140 (or a controller) may control overall operations of the electronic device 100 by using various programs stored in the memory 130. In this case, the processor 140 may include a RAM 141, a ROM 142, a graphic processor 143, a main CPU 144, first to n-th interfaces 145-1 to 145-n, and a bus 146 as shown in FIG. 2B. In this case, the RAM 141, the ROM 142, the graphic processor 143, the main CPU 144, and the first to n-th interfaces 145-1 to 145-n may be connected with one another via the bus 146.

Figure 4:
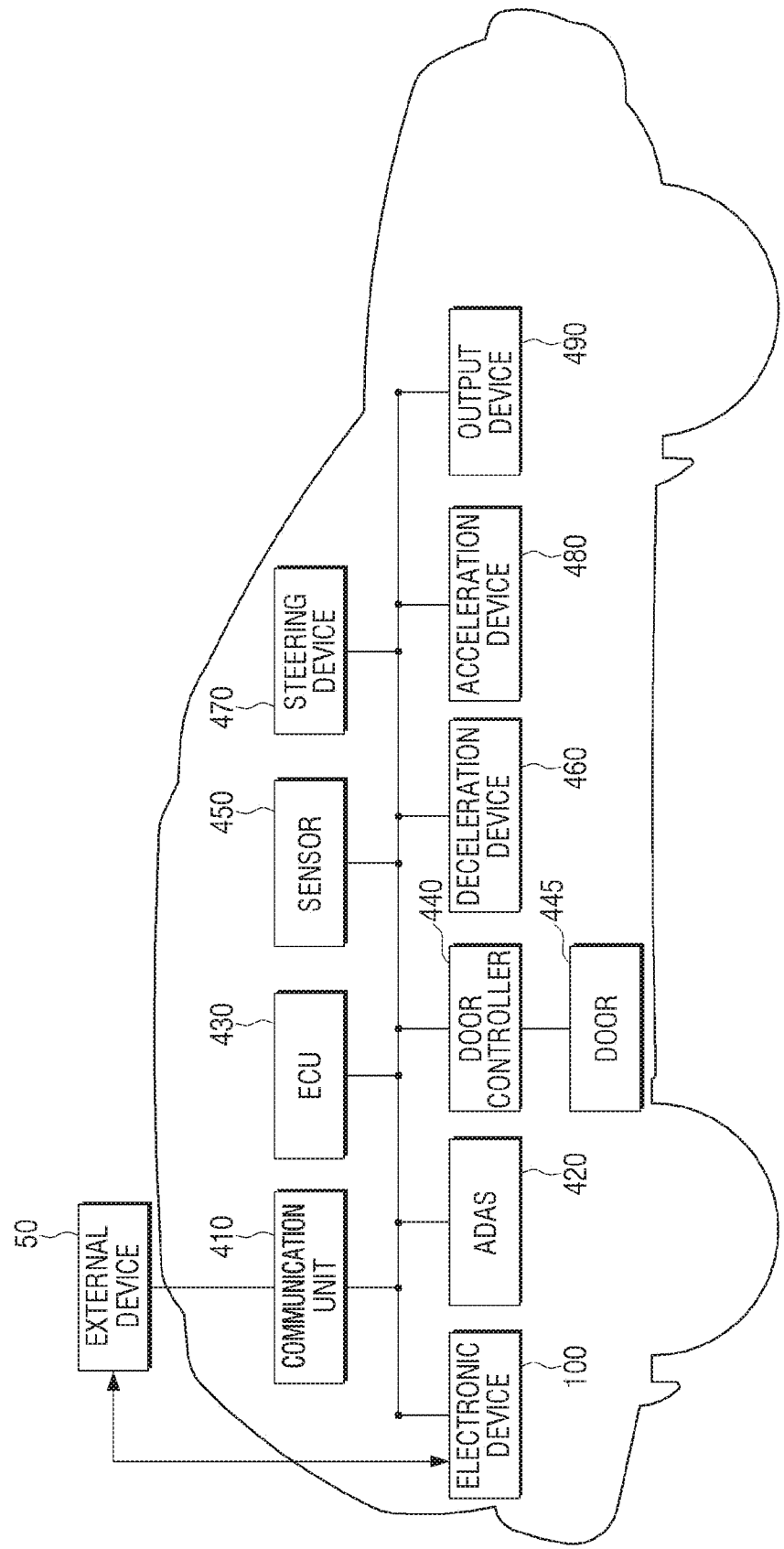
FIG. 4 is a block diagram illustrating a configuration of a vehicle including an electronic device according to an embodiment of the disclosure.

FIG. 4 is a block diagram illustrating a configuration of a vehicle including an electronic device according to an embodiment of the disclosure. FIG. 4 is a block diagram schematically illustrating a configuration of a system of a vehicle provided with an electronic device 100 according to an embodiment.

Referring to FIG. 4, the vehicle 10 may include the electronic device 100, a communication unit 410, an ADAS 420, an ECU 430, a door controller 440 for controlling a door 445 of the vehicle 10, the door 445, a sensor 450, a deceleration device 460 (for example, a brake pedal or the like), a steering device 470 (for example, a wheel or the like), an acceleration device 480 (for example, an acceleration pedal or the like), and an output device 490.

The electronic device 100 may communicate with the vehicle 10 (in particular, the ADAS 420 or the ECU 430) in a wired communication method. For example, the electronic device 100 may communicate with the vehicle 10 through a 20-pin connector, a 16-pin connector, or a USB connector. In addition, the electronic device 100 may communicate with the vehicle 10 according to a communication protocol, such as on-board diagnosis version I (OBD-1), OBD-2, European on-board diagnosis (EOBD), Korean on-board diagnosis (KOBD), K-line, RS-232, controller area network (CAN).

The communication unit 410 may communicate with an external device 50 of the vehicle 10. In particular, the communication unit 410 may communicate with an external server to obtain region information, and may also communicate with an eternal traffic guidance device to obtain traffic guidance information.

The communication unit 410 may communicate with the external device 50 (for example, a cloud server) located outside the vehicle 10, by using a long-range communication module or a short-range communication module. When the long-range communication module is used, the communication unit 410 may communicate with the external device 50 according to communication standards such as IEEE, 3rd generation (3G), $3^{rd}$ generation partnership project (3GPP), long term evolution (LTE), GPS, or the like. When the short-range communication module is used, the communication unit 410 may communicate with the external device 50 according to communication standards such as Wi-Fi, Bluetooth, NFC, Zigbee, Picocast, or the like.

The ADAS 420, which is an advanced driver assist system, may include: a lane departure warning system (LDWS) which detects a departure from a lane made without turning on a turn signal, and provides corresponding information to a driver; a forward collision warning system (FCWS) which recognizes a vehicle ahead in real time with a camera mounted on a front portion of a vehicle, and warns of danger of accident in advance based on a motion of the vehicle ahead; an intelligent parking assist system (IPAS) which automatically assists drivers in parking vehicles through front and rear detection sensors and a voice guidance; a car navigation system (CNS) which has a GPS device embedded therein to automatically display a vehicle's location and simultaneously to provide surrounding traffic situations in real time; a rear parking assist system (RPAS) which detects a collision in advance while parking and guides a driver to allow the driver to exactly grasp a parking space when parking at the back; and a pedestrian collision warning system (PCWS) which recognizes a pedestrian and detects an accident caused by driver's carelessness in advance, and guides the driver.

The ECU 430 controls overall operations related to the driving of the vehicle 10, such as driving/braking/steering of the vehicle 10. The ECU 430 may detect a state of the vehicle 10, and may determine an injection quantity of fuel and an ignition time to prevent a breakdown of an engine of the vehicle 10. For example, the ECU 430 may calibrate a water temperature sensor, an oxygen sensor, or the like, based on an ignition time manifold absolute pressure (MAP) value and a fuel injection MAP value, which are pre-set by considering the number of revolutions and an amount of sucked air of the engine, a suction pressure, a degree of opening of an accelerator, and may adjust an opening and closing rate of an injector.

The door controller 440 may control the lock of the door 445 according to a user's operation or a traveling state of the vehicle 10. For example, when the vehicle travels at higher than a predetermined speed, the door controller 440 may automatically lock the door 445.

The sensor 450 may detect an ambient environment of the vehicle 10, or a state of a driver who rides on the vehicle 10. The sensor 450 may include an object detection sensor, such as a lidar sensor, a radar sensor, an ultrasonic sensor, a vision sensor, or the like, to detect the ambient environment of the vehicle 10. In this case, the ambient environment of the vehicle 10 may refer to information on other vehicles located on the periphery of the vehicle 10, or information regarding occupied things or persons located on the periphery of the vehicle 10.

Alternatively, the sensor 450 may include a sound sensor, a motion detection sensor, a video sensor, a touch sensor, or the like to detect the state of the driver. In this case, the state of the driver may refer to driver's fatigability, a driver's driving posture, or the like. In particular, the driver's fatigability may be determined by tracking user's eyes, a user's face motion, or the like.

In addition, the sensor 450 may further include at least one of an acceleration sensor, a gyro sensor, an illuminance sensor, a proximity sensor, a pressure sensor, a noise sensor (for example, a microphone), a video sensor (for example, a camera module), a temperature sensor, a shock sensor, and a timer.

In addition, the deceleration device 460 may be configured to reduce the speed of the vehicle 10, and may include a brake pedal or the like, and the steering device 470 may be configured to determine a traveling direction of the vehicle 10, and may include a wheel or the like. The acceleration device 480 may be configured to increase the speed of the vehicle 10, and may include an accelerating pedal or the like.

The output device 490 may be configured to output the state of the vehicle or a content set by the user, and may include a speaker, a display, a vibration device, or the like. In this case, the display may be a normal LCD display, but this is merely an example. The display may be a head-up display.

The electronic device 100 may directly transmit a control command to the above-described elements, or may transmit a control command to the ADAS 420 or the ECU 430. Alternatively, the electronic device 100 may be implemented as the ADAS 420 or the ECU 430, or a portion thereof.

FIG. 5 is a flowchart to illustrate a method for providing a danger object in an electronic device according to an embodiment of the disclosure.

Referring to FIG. 5, the electronic device 100 obtains region information of a region located around the path of the vehicle at operation S510. In this case, the electronic device 100 may obtain the region information of the region located around the path of the vehicle in advance to predict a danger object in real time.

Specifically, when the user sets a path through a navigation device, the electronic device 100 may receive region information of the periphery of the set path from an external server in advance, and may store the region information. For example, when the user sets a path from an A region to a B region through the navigation device, the electronic device 100 may receive region information of regions existing between the A region and the B region from the external server in advance, and may store the region information.

In addition, the electronic device 100 may update a current location according to a movement of the vehicle 10, and may receive information regarding a region within a predetermined distance from the updated location from the external server in advance, and may store the information.

For example, the electronic device 100 may receive information regarding a region within a distance of 20 km from the current device from the external server in advance, and may store the information, and, when the vehicle moves from the current location by 15 km, the electronic device 100 may receive information regarding a region within the distance of 20 km from the moved location from the external server in advance, and may store the information.

In addition, the electronic device 100 may periodically receive region information regarding all regions in advance, and may store the information. When the vehicle 10 enters a specific region (for example, an accident hazard), the electronic device 100 may receive region information regarding the specific region in advance, and may store the region information.

The electronic device 100 obtains an image by photographing a road on which the vehicle 10 travels through the camera at operation S520. In this case, the electronic device 100 may obtain an image regarding a front area of the road on which the vehicle 10 travels, but this is merely an example. The electronic device 100 may obtain an image regarding a rear area or a side area of the road on which the vehicle 10 travels. In this case, the electronic device 100 may obtain an image of a different area according to a gear state. For example, when the gear state is D, the electronic device 100 may obtain images regarding the front area and the side area of the road on which the vehicle 10 travels, and, when the gear state is R, the electronic device 100 may obtain an image regarding the rear area of the road on which the vehicle 10 travels.

The electronic device 100 obtains road information of the road on which the vehicle 10 travels, by analyzing the obtained image at operation S530. Specifically, the electronic device 100 may obtain information regarding an object included in the image by analyzing the obtained image. In this case, the electronic device 100 may obtain information regarding an object (for example, a type of an object, a location of an object, or the like) by inputting image data to the object recognition model 370 which is trained to estimate an object.

In addition, the electronic device 100 may obtain the road information of the road on which the vehicle 10 travels, based on the information regarding the object. In this case, the electronic device 100 may obtain the road information by inputting the information regarding the object to the road information recognition model 380 which is trained to estimate road information. In this case, the road information may include arrangement information of the object included in the road, movement information, a blind spot included in the road, state information of the road, or the like.

In the above-described embodiment, the electronic device 100 obtains the information regarding the object by analyzing the image, and obtains the road information by analyzing the information regarding the object. However, this is merely an example, and the electronic device 100 may directly obtain the road information by analyzing the image. That is, the electronic device 100 may obtain the road information of the road on which the vehicle 10 currently travels, by inputting image data to the road information recognition model 380 trained to estimate road information, as input data.

The electronic device 100 obtains information regarding a virtual danger object which may appear on the road on which the vehicle travels, based on the road information and the region information at operation S540. Specifically, the electronic device 100 may calculate a probability that a virtual danger object appears on the road on which the vehicle travels, based on the road information and the region information. In addition, when the calculated probability is higher than or equal to a predetermined value, the electronic device 100 may obtain the information regarding the virtual danger object based on the road information and the region information.

In particular, the electronic device 100 may obtain the information regarding the virtual danger object by inputting the road information and the region information to the danger object recognition model 390 which is trained to estimate a danger object. In this case, the information regarding the danger object may include type information of the danger object, information regarding a location in which the probability that the danger object appears is high, and movement pattern information of the danger object.

In addition, the electronic device 100 may calculate the probability that the virtual danger object appears based on current time information, in addition the road information and the region information. For example, when the current time is time of going to school/coming home from school, the electronic device 100 may add a weight to increase the probability of the appearance of a child object, which is a virtual danger object, and, when the current time is dawn, the electronic device 100 may add a weight to reduce the probability of the appearance of an object which is a virtual danger object.

In addition, the electronic device 100 may calculate the probability of the appearance of the virtual danger object based on additional information regarding a similar road which is registered as being similar to the road on which the vehicle 10 currently travels, in addition to the road information and the region information. For example, when the current location is at crossroads and there are many elementary schools nearby, the electronic device 100 may calculate the probability of the appearance of the virtual danger object by additionally using additional information regarding a similar road (for example, traffic accidents or the like).

In addition, the electronic device 100 may calculate the probability of the appearance of the virtual danger object based on traffic guidance information received from a traffic guidance device, in addition to the road information and the region information. For example, when traffic guidance information "Wildlife Detection Zone" is received from a traffic guidance device, the electronic device 100 may add a weight to increase a probability that a wildlife object appears as a virtual danger object. When traffic guidance information "Children Protection Zone" is received from a traffic guidance device, the electronic device 100 may add a weight to increase a probability that a child object appears as a virtual danger object.

In addition, the electronic device 100 may calculate the probability of the appearance of the virtual danger object based on history information regarding user's driving habits, in addition to the road information and the region information. For example, when a driver's usual average speed in an A region (for example, a children protection zone) is higher than or equal to a predetermined value (for example, 30 km/h), the electronic device 100 may add a weight to increase the probability of the appearance of the danger object in the A region.

In addition, the electronic device 100 provides the information regarding the danger object at operation S550. In this case, the electronic device 100 may generate an indicator corresponding to the danger object, and may output the indicator through the display 170. In this case, the indicator corresponding to the danger object may have a shape corresponding to the type of the danger object, and may be displayed on a location where the probability of the appearance of the danger object is high. Alternatively, the electronic device 100 may output a guidance audio corresponding to the danger object through the speaker 180. In this case, the guidance audio may include the information regarding the danger object.

In addition, the electronic device 100 may provide an animated image as the indicator corresponding to the danger object to be distinguished from the real object. In addition, the electronic device 100 may provide the guidance audio along with the visual indicator to notify of the danger object.

Hereinafter, a method for providing a danger object in an electronic device according to various embodiments will be described with reference to FIGS. 6A to 8E.

FIGS. 6A, 6B, 6C, 6D, 6E and 6F are views to illustrate an embodiment in which a child object is predicted as a danger object and is provided according to an embodiment of the disclosure.

Referring to FIG. 6A, the electronic device 100 may obtain location information of the vehicle 10 including the electronic device 100. In this case, the electronic device 100 may obtain location information of the vehicle 100 by using the GPS 150.

Referring to FIG. 6B, the electronic device 100 may obtain region information regarding the current location. In this case, the electronic device 100 may obtain the region information regarding the current location in advance, and may store the region information.

The region information may be obtained from big data. In this case, the big data may collect not only information regarding the corresponding region, but also information regarding other regions registered as having a similar road to the road of the corresponding region. As shown in FIG. 6B, the region information may include information regarding the population needing to be careful with safety (that is, child population), rush hour, the number of daycare centers and the number of children to be accommodated, the number of middle schools and the number of students, a traffic accident rate, a children traffic accident rate, causes of traffic accidents, or the like, but is not limited thereto.

Referring to FIG. 6C, the electronic device 100 may obtain an image regarding a front area of the vehicle 10 through the camera 110.

Referring to FIG. 6D, the electronic device 100 may detect a plurality of objects 610-1 to 610-4 from the obtained image. Specifically, the electronic device 100 may obtain information regarding the plurality of objects 610-1 to 610-4 by inputting the obtained image to a recognition model which is trained to estimate an object. In this case, the electronic device 100 may detect a plurality of vehicles objects as the plurality of objects 610-1 to 610-4.

Referring to FIG. 6E, the electronic device 100 may obtain road information based on the information regarding the plurality of objects 610-1 to 610-4. Specifically, the electronic device 100 may obtain the road information by inputting the information regarding the objects to a recognition model which is trained to estimate road information. In this case, the electronic device 100 may detect first to third blind spots 620-1 to 620-3 as the road information as shown in FIG. 6E. That is, the electronic device 100 may detect a rear area of the extracted vehicle object or an area between the extracted vehicle objects as the blind spot.

Referring to FIG. 6F, the electronic device 100 may obtain information regarding a virtual danger object which is highly likely to appear on the road on which the vehicle 10 travels, based on the region information and the road information. In this case, the electronic device 100 may calculate a probability that the danger object appears based on the region information and the road information.

According to an embodiment, the probability P that the danger object appears may be determined by the following equation:

$$P = \alpha * a * b * c \qquad \text{Equation 1}$$

where α is a weight (the weight may be determined by current time information, traffic guidance information, history information, or the like), a is a ratio of population needing to be careful with safety in the corresponding region, b is a ratio of traffic accidents occurring in the population that needs to be careful with safety with regard to traffic accidents occurring in the corresponding region, and c is a ratio of traffic accidents having causes of accidents occurring in the corresponding road.

When the probability P calculated by the above-described equation is higher than or equal to a predetermined value, the electronic device 100 may obtain information regarding the danger object based on the region information and the road information. For example, the electronic device 100 may determine a child object as type information of a current object, based on the ratio of the population needing to be careful with safety, and the ratio of current schools/private educational institutes, may obtain movement pattern information corresponding to the determined object type, and may obtain information regarding a location where the probability of the appearance of the danger object is high through blind spot information.

The electronic device 100 may obtain the information regarding the danger object by inputting the road information and the region information to the danger object recognition model which is trained to estimate a danger object.

In addition, the electronic device 100 may provide an indicator 630 corresponding to the danger object through the display 170, based on the information regarding the danger object, as shown in FIG. 6F. In this case, the indicator 630 may be an animated image of a child predicted as a danger object. The electronic device 100 may display the indicator 630, and simultaneously, may provide a guidance audio or vibration feedback to notify of the danger object.

In addition, when the probability of the appearance of the object is high, the electronic device 100 may transmit a control command for controlling the driving of the vehicle 10 to the vehicle 10. For example, the electronic device 100 may transmit a control command for controlling the deceleration device 470 to the vehicle 10, along with a guidance audio saying "There is a high possibility that children may appear ahead. The speed will be reduced."

FIGS. 7A to 7F are views to illustrate an embodiment in which a motorcycle object is predicted as a danger object and is provided according to an embodiment of the disclosure.

Referring to FIG. 7A, the electronic device 100 may obtain location information of the vehicle 10 including the electronic device 100. In this case, the electronic device 100 may obtain location information of the vehicle 10 by using the GPS 150.

Referring to FIG. 7B, the electronic device 100 may obtain region information regarding the current location. In this case, the electronic device 100 may obtain the region information regarding the current location in advance, and may store the region information. In this case, the region information may include information regarding motorcycle traffic, motorcycle accidents, rush hour, traffic accidents, or the like as shown in FIG. 7B, but is not limited thereto.

Referring to FIG. 7C, the electronic device 100 may obtain an image regarding a front area of the vehicle 10 through the camera 110.

Referring to FIG. 7D, the electronic device 100 may detect a plurality of objects 710-1 and 710-2 from the obtained image. Specifically, the electronic device 100 may obtain information regarding the plurality of objects 710-1 and 710-2 by inputting the obtained image to a recognition model which is trained to estimate an object. In this case, the electronic device 100 may detect first and second vehicle objects 710-1 and 710-2 as the plurality of objects.

Referring to FIG. 7E, the electronic device 100 may obtain road information based on the information regarding the plurality of objects 710-1 and 710-2. Specifically, the electronic device 100 may obtain the road information by inputting the information regarding the objects to a recognition model which is trained to estimate road information. In this case, the electronic device 100 may detect a blind spot 720 as the road information as shown in FIG. 7E. That is, the electronic device 100 may detect an area where a motorcycle or a pedestrian jaywalking appears between the first and second vehicle objects as the blind spot.

In addition, as shown in FIG. 7F, the electronic device 100 may obtain information regarding a virtual danger object which is highly likely to appear on the road on which the vehicle 10 travels, based on the region information and the road information. In this case, the electronic device 100 may calculate a probability that the danger object appears based on the region information and the road information.

According to an embodiment, the probability P that the danger object appears may be determined by the following equation:

$$P=\alpha *a*b \qquad \text{Equation 2}$$

where α is a weight (the weight may be determined by current time information, traffic guidance information, history information, or the like), a is a ratio of motorcycle traffic in the corresponding region, and b is a ratio of motorcycle accidents in the corresponding region.

When the probability P calculated by the above-described equation is higher than or equal to a predetermined value, the electronic device 100 may obtain information regarding the danger object based on the region information and the road information.

The electronic device 100 may obtain the information regarding the danger object by inputting the road information and the region information to the danger object recognition model which is trained to estimate a danger object.

In addition, the electronic device 100 may provide an indicator 730 corresponding to the danger object through the display 170, based on the information regarding the danger object, as shown in FIG. 7F. In this case, the indicator 730 may be an animated image of a motorcycle predicted as a danger object.

FIGS. 8A to 8E are views to illustrate an embodiment in which a wildlife object is predicted as a danger object and is provided according to an embodiment of the disclosure.

Referring to FIG. 8A, the electronic device 100 may obtain location information of the vehicle 10 including the electronic device 100. In this case, the electronic device 100 may obtain location information of the vehicle 10 by using the GPS 150.

Referring to FIG. 8B, the electronic device 100 may obtain region information regarding the current location. In this case, the electronic device 100 may obtain the region information regarding the current location in advance, and may store the region information. In this case, the region information may include information regarding inhabiting wildlife, wildlife accidents, a ratio of traffic accidents, whether a wildlife detection zone is designated or not, or the like as shown in FIG. 8B, but is not limited thereto.

Referring to FIG. 8C, the electronic device 100 may obtain an image regarding a front area of the vehicle 10 through the camera 110.

Referring to FIG. 8D, the electronic device 100 may obtain road information from the obtained image. In this case, the electronic device 100 may obtain the road information by inputting the obtained image to a recognition model which is trained to estimate road information. In this case, the road information may be information 810 regarding a point at which the probability of the appearance of wildlife is high.

Referring to FIG. 7E, the electronic device 100 may obtain information regarding a virtual danger object which is highly likely to appear on the road on which the vehicle 10 travels, based on the region information and the road information. In this case, the electronic device 100 may calculate a probability that the danger object appears based on the region information and the road information.

According to an embodiment, the probability P that the danger object appears may be determined by the following equation:

$$P=\alpha *a*b \qquad \text{Equation 3}$$

where α is a weight (the weight may be determined by current time information, traffic guidance information, history information, or the like), a indicates whether wildlife inhabits the corresponding region, and b is a ratio of wildlife accidents in the corresponding region.

When the probability P calculated by the above-described equation is higher than or equal to a predetermined value, the electronic device 100 may obtain information regarding the danger object based on the region information and the road information. The electronic device 100 may obtain the information regarding the danger object by inputting the road information and the region information to the danger object recognition model which is trained to estimate a danger object.

In addition, the electronic device 100 may provide an indicator 820 corresponding to the danger object through the display 170, based on the information regarding the danger object, as shown in FIG. 8E. In this case, the indicator 820 may be an animated image of a deer predicted as a danger object.

According to an embodiment as described above, the electronic device 100 provides information regarding a virtual danger object that the user cannot currently recognize, such that an unexpected accident can be prevented in advance.

Figure 9:
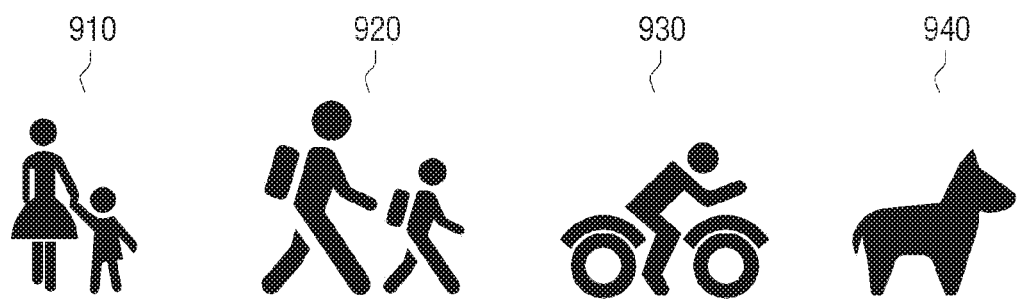
FIG. 9 is a view illustrating various danger objects according to an embodiment of the disclosure.

According to an embodiment, the electronic device 100 may provide an animated image of an object which is predicted as a danger object as an indicator to avoid confusion between a virtual object and a real object. In this case, the indicator may include, for example, an indicator 910 corresponding to a children object, an indicator 920 corresponding to a student object, an indicator 930 corresponding to a motorcycle object, and an indicator 940 corresponding to a puppy object, as shown in FIG. 9, but is not limited thereto.

Figure 10A:
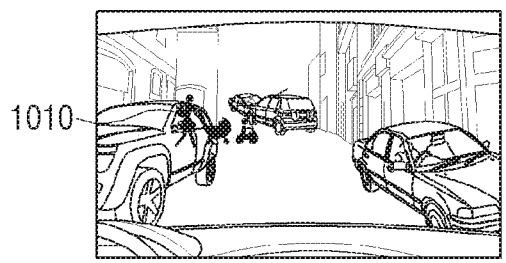
FIG. 10A is a view to illustrate an example of providing an indicator corresponding to a danger object by using a head up display according to an embodiment of the disclosure.
Figure 10B:
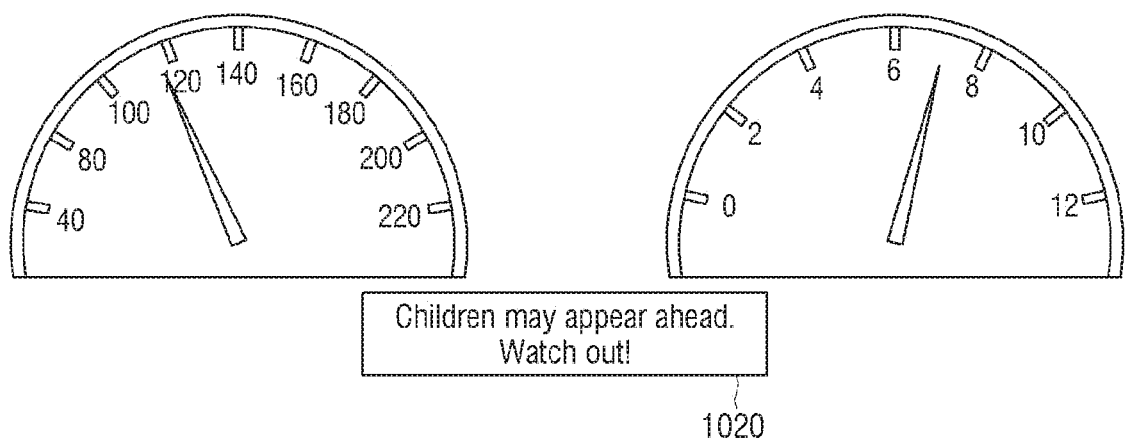
FIG. 10B is a view to illustrate an example of providing an indicator corresponding to a danger object by using a cluster in a vehicle according to an embodiment of the disclosure.
Figure 10C:
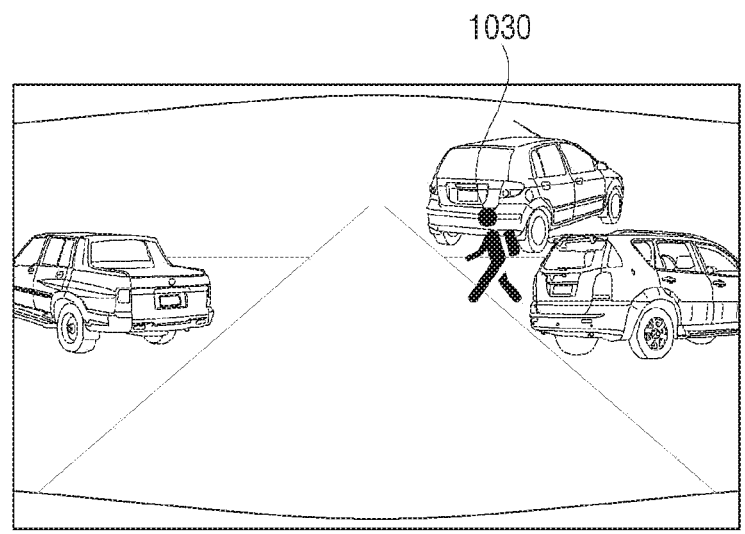
FIG. 10C is a view to illustrate an example of providing a danger object on an image photographed by a rear facing camera according to an embodiment of the disclosure.
Figure 10D:
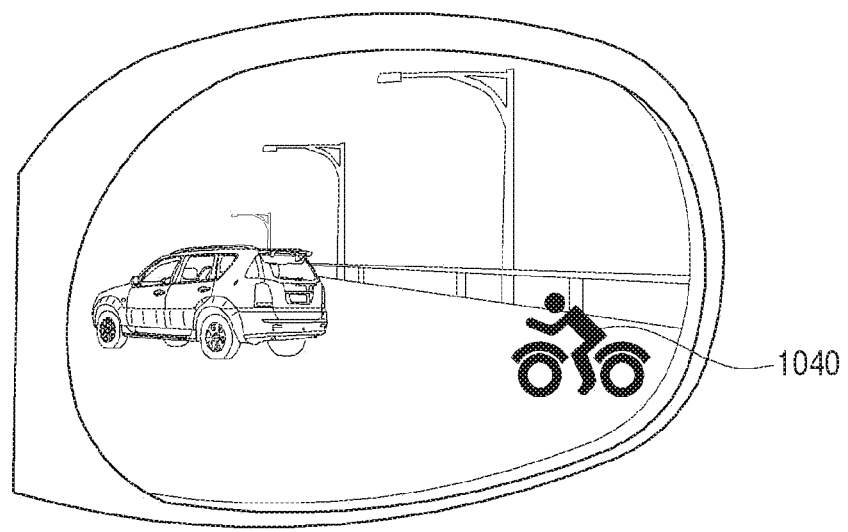
FIG. 10D is a view to illustrate an example of providing a danger object on a side view mirror according to an embodiment of the disclosure.

FIGS. 10A, to 10D are views to illustrate an embodiment in which the electronic device 100 provides information regarding a danger object according to various embodiments of the disclosure.

Referring to FIG. 10A, the electronic device 100 may provide information regarding a danger object by using a head up display (HUD) disposed on a windshield. Specifically, the electronic device 100 may determine a type, a location, and a movement speed of an indicator 1010 corresponding to the danger object, based on the information regarding the danger object. In addition, the electronic device may display the determined type of the indicator on the determined location as shown in FIG. 10A, and may move the indicator according to the determined movement speed.

Referring to FIG. 10B, the electronic device 100 may provide information regarding a danger object in a cluster of vehicles. Specifically, the electronic device 100 may output a guidance message 1020 (for example, "Children may appear ahead. Watch out!") including information regarding the danger object. In this case, the electronic device 100 may display the guidance message 1020 while making it flicker in order to warn the user of danger well, and may provide a guidance sound (for example, a beep sound) and/or read the guidance message (e.g., outputting the guidance message via text to speech) through the speaker.

In the above-described embodiment, the electronic device 100 provides a danger object on an image which is obtained by photographing a front area of the vehicle 10. However, this is merely an example.

Referring to FIG. 10C, the electronic device 100 may provide an indicator 1030 corresponding to a danger object on an image which is obtained by photographing a rear area of the vehicle 10, and as shown in FIG. 10D, the electronic device 100 may provide an indicator 1040 corresponding to a danger object on an image which is obtained by photographing a side area of the vehicle 10, through a side view mirror.

The electronic device 100 may determine whether a danger object really appears to share information on whether the danger object really appears with other drivers. When the danger object really appears, the electronic device 100 may share information regarding the danger object really appearing and current location information with other drivers. In this case, the electronic device 100 may transmit the information regarding the really appearing danger object and the current location information to an external server, and the external server may transmit the information on whether the danger object really appears to electronic devices in vehicles of other drivers as region information.

Figure 11:
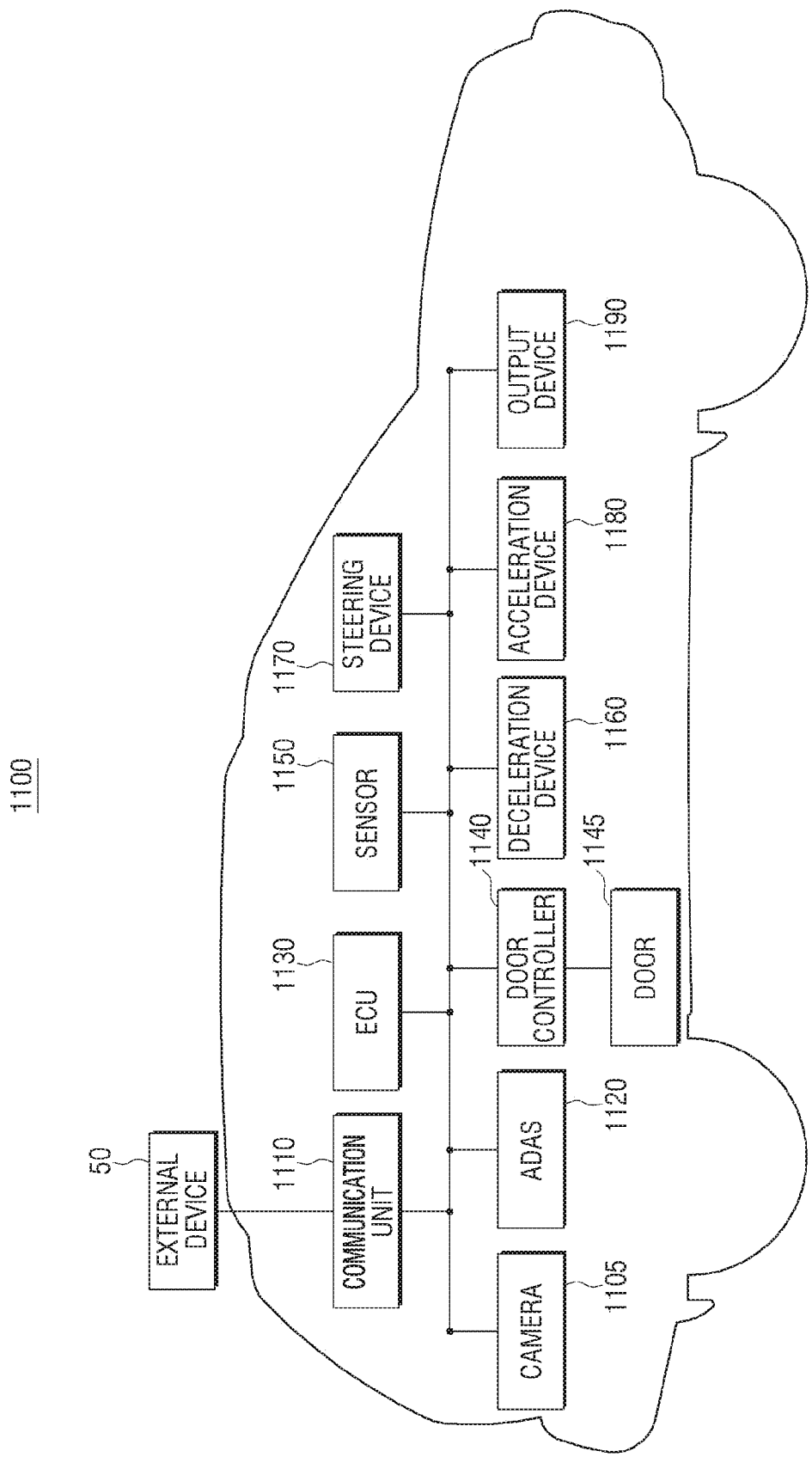
FIG. 11 is a block diagram to illustrate an embodiment in which an electronic device is implemented as a portion of a vehicle according to another embodiment of the disclosure.

In the above-described embodiments, the electronic device 100 is provided in the vehicle 10 and is implemented separately from the vehicle 10. However, this is merely an example. The electronic device 100 may be implemented as a portion of the vehicle. Specifically, the electronic device 100 may be implemented as one of an ADAS 1120 and an ECU 1130 of a vehicle 1100, or a portion thereof. In addition, the ECU 1130 or the ADAS 1120 which functions as the above-described electronic device 100 may directly control respective elements of the vehicle. In this case, some of the elements of the electronic device 100 (for example, the display 170, the speaker 180) may be implemented as an output device 1190 of the vehicle 10. Since a camera 1105, a communication unit 1110, the ADAS 1120, the ECU 1130, a door controller 1140, a door 1145, a sensor 1150, a deceleration device 1160, a steering device 1170, an acceleration device 1180, and the output device 1190 illustrated in FIG. 11 are the same as the camera 110, the communication unit 410, the ADAS 420, the ECU 430, the door controller 440, the door 445, the sensor 450, the deceleration device 460, the steering device 470, the acceleration device 480, and the output device 490 illustrated in FIGS. 2B and 4, a redundant explanation is omitted.

In addition, some of the elements of the vehicle 1100 may be implemented by an external device connected with the vehicle 1100. For example, the output device 1190 may be implemented as an output device of an external device (for example, a navigation device), and the camera 1190 may be implemented as a camera of an external device (for example, a dash camera).

Figure 12:
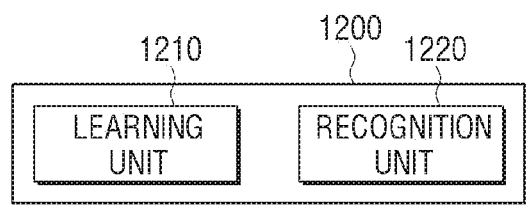
FIG. 12 is a block diagram illustrating a configuration of an electronic device for training and using a recognition model according to an embodiment of the disclosure.

FIG. 12 is a block diagram illustrating a configuration of an electronic device (in particular, a processor) for training a recognition model and using the same according to an embodiment of the disclosure.

Referring to FIG. 12, the processor 1200 may include at least a learning unit 1210 and a recognition unit 1220. The processor 1200 of FIG. 12 may correspond to the processor 140 of the electronic device 100 of FIGS. 2A and 2B, or a processor of a data learning server (not shown).

The learning unit 1210 may generate or train a recognition model having a criterion for determining a predetermined situation or recognizing an object. The learning unit 1210 may generate a recognition model having a criterion for determining by using collected training data.

For example, the learning unit 1210 may generate, train, or refine an object recognition model for determining a criterion for estimating an object included in an image by using the image including the object as training data.

In another example, the learning unit 1210 may generate, train, or refine a road information recognition model for determining a criterion for estimating road information of a road on which the vehicle 10 travels, included in an image, by using information regarding an object detected from the image or the image as training data.

In still another example, the learning unit 1210 may generate, train, or refine a danger object recognition model for determining a criterion for estimating a danger object by using road information and region information as training data.

The recognition unit 1220 may estimate a recognition target or a situation included in predetermined data by using the predetermined data as input data of a trained recognition model.

For example, the recognition unit 1220 may obtain (or estimate or infer) information regarding an object included in an image by using the image including the object as input data of a trained recognition model.

In another example, the recognition unit 1220 may obtain (or determine or infer) road information by applying at least one of information regarding an object or an image to a trained recognition model.

In still another example, the recognition unit 1220 may obtain (or estimate or infer) information regarding a danger object which is highly likely to appear on the road on which the vehicle 10 including the electronic device 100 travels, by applying road information and region information to a trained recognition model.

At least a portion of the learning unit 1210 and at least a portion of the recognition unit 1220 may be implemented as a software module or may be fabricated in the form of at least one hardware chip and may be mounted in the electronic device. For example, at least one of the learning unit 1210 and the recognition unit 1220 may be fabricated in the form of a dedicated hardware chip for AI, or may be fabricated as a portion of a generic-purpose processor (for example, a CPU or an application processor) or a graphic-dedicated processor (GPU), and may be mounted in various electronic devices described above or an object recognition device. In this case, the dedicated hardware chip for AI may be a dedicated processor which is specified for calculation of a probability, and has higher parallel processing performance than in the generic-purpose processor, and thus can rapidly process calculation in the AI field such as machine learning. When the learning unit 1210 and the recognition unit 1220 are implemented as a software module (or a program module including instructions), the software module may be stored in non-transitory computer readable media. In this case, the software module may be provided by an operating system (OS), or may be provided by a predetermined application. Alternatively, a portion of the software module may be provided by the OS, and the other portion may be provided by the predetermined application.

In this case, the learning unit 1210 and the recognition unit 1220 may be mounted in one electronic device, or may be mounted in separate electronic devices, respectively. For example, one of the learning unit 1210 and the recognition unit 1220 may be included in the electronic device 100, and the other one may be included in an external server. In addition, the learning unit 1210 and the recognition unit 1220 may communicate with each other wiredly or wirelessly, and model information established by the learning unit 1210 may be provided to the recognition unit 1220, and data inputted to the learning unit 1210 may be provided to the learning unit 1210 as additional training data.

Figure 13A:
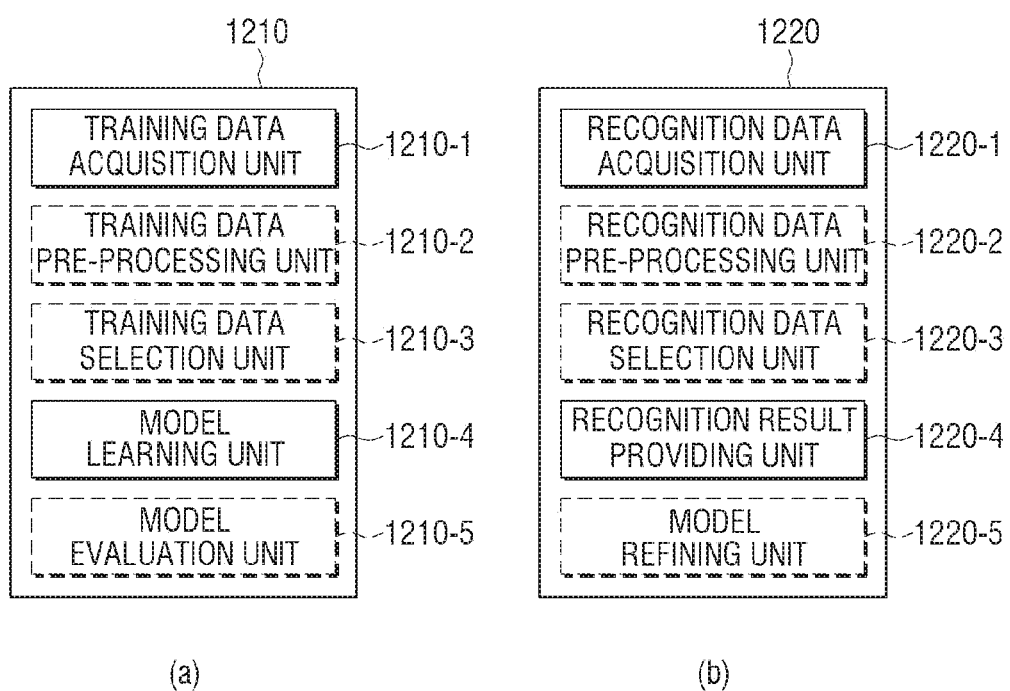
FIGS. 13A and 13B are block diagrams illustrating a specific configuration of a learning unit and a recognition unit according to various embodiments of the disclosure.

FIG. 13A is a block diagram of the learning unit 1210 and the recognition unit 1220 according to various embodiments of the disclosure.

Referring to view (a) of FIG. 13A, the learning unit 1210 according to some embodiments may include a training data acquisition unit 1210-1 and a model learning unit 1210-4. In addition, the learning unit 1210 may further include at least one of a training data pre-processing unit 1210-2, a training data selection unit 1210-3, and a model evaluation unit 1210-5 selectively.

The training data acquisition unit 1210-1 may acquire training data necessary for a recognition model for inferring a recognition target. In an embodiment, the training data acquisition unit 1210-1 may acquire at least one of an image including an object, information regarding an object, road information, and region information, as training data. The training data may be data which is collected or tested by the learning unit 1210 or a manufacturer of the learning unit 1210.

The model learning unit 1210-4 may train a recognition model by using training data to have a determination criterion regarding how a predetermined recognition target is determined. For example, the model learning unit 1210-4 may train the recognition model through supervised learning which uses at least a portion of the training data as a determination criterion. Alternatively, the model learning unit 1210-4 may train the recognition model through unsupervised learning which discovers a determination criterion for determining a situation by learning from training data by itself without separate supervision. In addition, the model learning unit 1210-4 may train the recognition model through reinforcement learning which uses feedback regarding whether a result of determining a situation according to learning is correct. In addition, the model learning unit 1210-4 may train the recognition model by using a learning algorithm including error back propagation or gradient descent, for example.

In addition, the model learning unit 1210-4 may learn a selection criterion regarding what training data will be used to estimate a recognition target by using training data.

When there are a plurality of recognition models already established, the model learning unit 1210-4 may determine a recognition model having a high correlation between inputted training data and basic training data, as a recognition model to be trained. In this case, the basic training data may be already classified according to a type of data, and the recognition model may be already established according to a type of data. For example, the basic training data may be already classified according to various criteria, such as a region in which training data is generated, a time at which training data is generated, a size of training data, a genre of training data, a generator of training data, or a type of an object in training data.

When the recognition model is trained, the model learning unit 1210-4 may store the trained recognition model. In this case, the model learning unit 1210-4 may store the trained recognition model in the memory 130 of the electronic device 100. Alternatively, the model learning unit 1210-4 may store the trained recognition model in a memory of a server connected with the electronic device 100 via a wired or wireless network.

The learning unit 1210 may further include the training data pre-processing unit 1210-2 and the training data selection unit 1210-3 to enhance a result of analyzing by the recognition model or to save resources or time necessary for generating the recognition model.

The training data pre-processing unit 1210-2 may pre-process acquired data to be used for learning for determining a situation. The training data pre-processing unit 1210-2 may process the acquired data in a predetermined format such that the model learning unit 1210-4 can use the acquired data to learn to determine a situation.

The training data selection unit 1210-3 mays select data necessary for training from the data acquired by the training data acquisition unit 1210-1 or the data pre-processed by the training data pre-processing unit 1210-2. The selected training data may be provided to the model learning unit 1210-4. The training data selection unit 1210-3 may select training data necessary for training from data obtained or pre-processed according to a predetermined selection criterion. In addition, the training data selection unit 1210-3 may select training data according to a selection criterion pre-set by training by the model learning unit 1210-4.

The learning unit 1210 may further include the model evaluation unit 1210-5 to enhance a result of analyzing by a data recognition model.

The model evaluation unit 1210-5 may input evaluation data to the recognition model, and, when a result of analysis outputted from the evaluation data does not satisfy a predetermined criterion, the model learning unit 1210-4 may be made to be trained again. In this case, the evaluation data may be data which is pre-defined to evaluate the recognition model.

For example, when the number or ratio of evaluation data resulting in an inexact result of analysis among the results of analyzing by the recognition model trained with the evaluation data exceeds a predetermined threshold, the model evaluation unit 1210-5 may evaluate that the predetermined criterion is not satisfied.

When there are a plurality of trained recognition models, the model evaluation unit 1210-5 may evaluate whether the respective trained recognition models satisfy the predetermined criterion, and may determine a model that satisfies the predetermined criterion as a final recognition model. In this case, when there are a plurality of models satisfying the predetermined criterion, the model evaluation unit 1210-5 may determine a predetermined certain model or a predetermined number of models in order of evaluation scores as final recognition models.

Referring to view (b) of FIG. 13A, the recognition unit 1220 according to some embodiments may include a recognition data acquisition unit 1220-1 and a recognition result providing unit 1220-4.

In addition, the recognition unit 1220 may further include at least one of a recognition data pre-processing unit 1220-2, a recognition data selection unit 1220-3, and a model refining unit 1220-5 selectively.

The recognition data acquisition unit 1220-1 may acquire data necessary for determining a situation or recognizing an object. The recognition result providing unit 1220-4 may determine a situation by applying the data acquired by the recognition data acquisition unit 1220-1 to the trained recognition model as an input value. The recognition result providing unit 1220-4 may provide a result of analyzing according to analysis purpose of data. The recognition result providing unit 1220-4 may obtain the result of analyzing by applying data selected by the recognition data pre-processing unit 1220-2 or the recognition data selection unit 1220-3, which will be described below, to the recognition model as an input value. The result of analyzing may be determined by the recognition model.

In an embodiment, the recognition result providing unit 1220-4 may obtain (or estimate) information regarding an object by applying image data including the object, obtained by the recognition data acquisition unit 1220-1, to the trained recognition model.

In another embodiment, the recognition result providing unit 1220-4 may obtain (or estimate) road information by applying at least one of image data and information regarding an object, obtained by the recognition data acquisition unit 1220-1, to the trained recognition model.

In still another embodiment, the recognition result providing unit 1220-4 may obtain (or estimate or predict) information regarding a virtual danger object by applying road information and region information, obtained by the recognition data acquisition unit 1220-1, to the trained recognition model.

The recognition unit 1220 may further include the recognition data pre-processing unit 1220-2 and the recognition data selection unit 1220-3 to enhance a result of analyzing by the recognition model or to save resources or time necessary for providing the result of analyzing.

The recognition data pro-processing unit 1220-2 may pre-process acquired data to be used for determining a situation. The recognition data pro-processing unit 1220-2 may process the acquired data in a predetermined format such that the recognition result providing unit 1220-4 can use the acquired data to determine a situation.

The recognition data selection unit 1220-3 mays select data necessary for determining a situation from the data acquired by the recognition data acquisition unit 1220-1 or the data pre-processed by the recognition data pre-processing unit 1220-2. The selected data may be provided to the recognition result providing unit 1220-4. The recognition data selection unit 1220-3 may select a portion or all of the data acquired or pre-processed according to a predetermined selection criterion for determining a situation. In addition, the recognition data selection unit 1220-3 may select data according to a selection criterion pre-set by training by the model learning unit 1210-4.

The model refining unit 1220-5 may control the recognition model to be refined based on evaluation of the result of analyzing provided by the recognition result providing unit 1220-4. For example, the model refining unit 1220-5 provides the result of analyzing provided by the recognition result providing unit 1220-4 to the model learning unit 1210-4, thereby requesting the model evaluation unit 1210-5 (e.g., a model learning unit) to additionally train or refine the recognition model.

Figure 13B:
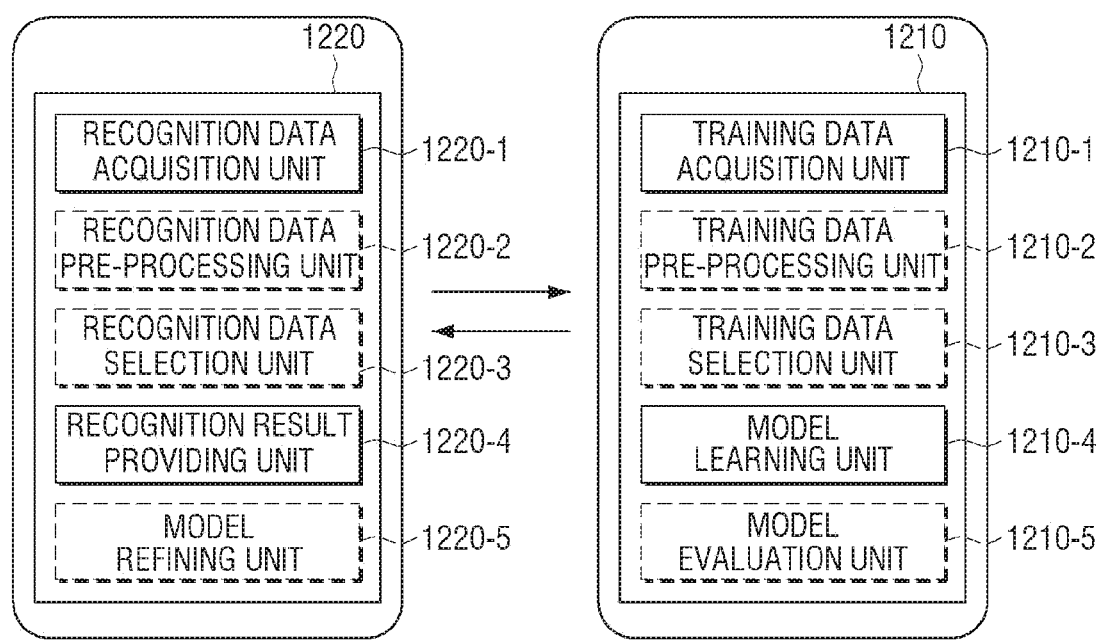

FIG. 13B is a view illustrating an example of the electronic device 100 and the external server 50 interworking with each other to learn and recognize data according to an embodiment of the disclosure.

Referring to FIG. 13B, the external server 50 may learn a criterion for determining a situation, and the electronic device 100 may determine a situation based on a result of learning by the server 50.

In this case, the model learning unit 1210-4 of the server 50 may perform the function of the learning unit 1910 illustrated in FIG. 12. The model learning unit 1210-4 of the server 50 may learn a criterion regarding which image, object information, road information, or region information will be used to determine a predetermined situation, or how the situation is determined by using the data.

In addition, the recognition result providing unit 1220-4 of the electronic device 100 may determine object information, road information, or danger object information by applying data selected by the recognition data selection unit 1220-3 to the recognition model generated by the server 50. Alternatively, the recognition result providing unit 1220-4 of the electronic device 100 may receive the recognition model generated by the server 50 from the server 50, and may determine a situation or recognize an object by using the received recognition model. In this case, the recognition result providing unit 1220-4 of the electronic device 100 may obtain object information included in an image by applying the image selected by the recognition data selection unit 1220-3 to the recognition model received from the server 50. Alternatively, the recognition result providing unit 1220-4 may obtain road information by applying an image or information regarding an object to the recognition model received from the server 50. Alternatively, the recognition result providing unit 1220-4 may obtain information regarding a danger object by applying road information and region information to the recognition model received from the server 50.

Figure 14:
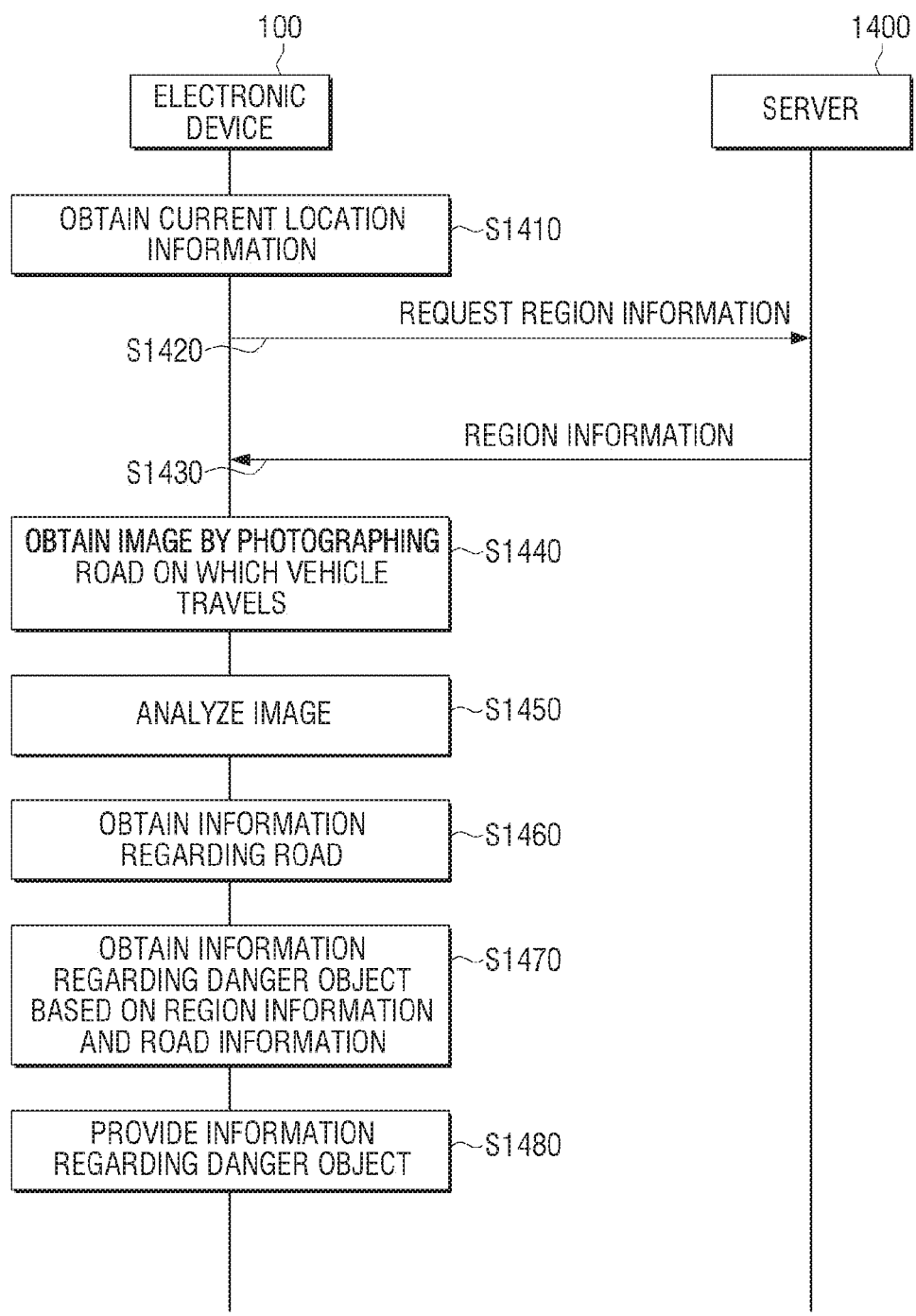
FIG. 14 is a flowchart to illustrate a method for providing a danger object in a system including an electronic device and a server according to an embodiment of the disclosure.

FIG. 14 is a flowchart to illustrate a method for providing a danger object in a system including an electronic device and a server according to an embodiment of the disclosure.

Referring to FIG. 14, the electronic device 100 may obtain current location information at operation S1410. In this case, the current location information may be obtained by using GPS information. However, this is merely an example. The current location information may be obtained through an external device (for example, a smartphone or the like) or a traffic guidance device on a street.

The electronic device 100 may request region information from the server 1400 based on the current location information at operation S1420. According to another embodiment, when a path is set through a navigation device, the electronic device 100 may transmit the current location information and path information to the server 1400.

The server 1400 may transmit region information to the electronic device 100 based on the current location information at operation S1430. In this case, the region information may be information regarding a region within a predetermined distance from the current location, or may be information regarding a region having the same administrative district as that of the current location, but is not limited thereto. In addition, the region information may be information regarding a region on the periphery of the set path.

The electronic device 100 may obtain an image by photographing a road on which the vehicle travels at operation S1440.

The electronic device 100 may analyze the obtained image at operation S1450, and may obtain information regarding the road based on the result of analyzing at operation S1460. In this case, the electronic device 100 may recognize an object included in the image by inputting the obtained image to an object recognition model as input data, and may obtain road information by inputting the recognized objects and image to a road information recognition model.

The electronic device 100 may obtain information regarding a danger object based on the region information and the road information at operation S1470. In this case, the electronic device 100 may obtain information regarding a virtual danger object by inputting the road information and the region information to a danger object recognition model as input data.

The electronic device 100 may provide the information regarding the object at operation S1480. In this case, the electronic device 100 may provide the information regarding the object in at least one form of visual feedback, acoustic feedback, and haptic feedback through various output devices.

Figure 15:
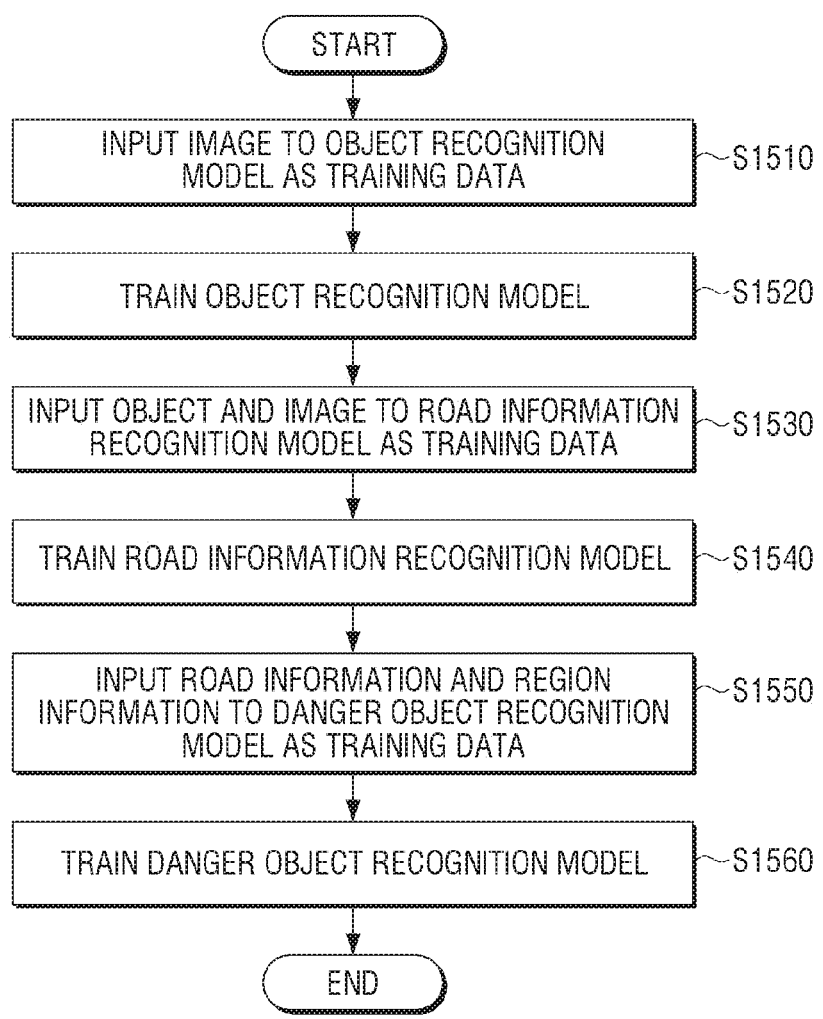
FIG. 15 is a flowchart to illustrate a training scenario of a recognition model according to an embodiment of the disclosure.

FIG. 15 is a flowchart to illustrate a training scenario of a recognition model according to an embodiment of the disclosure. In this case, the recognition model according to an embodiment may be trained by the electronic device 100. However, this is merely an example. Various electronic devices including a server may train the recognition model.

Referring to FIG. 15, the electronic device 100 may input an image to an object recognition model as training data at operation S1510. In this case, the image may be an image which is shot by a camera disposed in a vehicle. However, this is merely an example. The image may include various images which are shot by a camera disposed on a road, a camera disposed on a bicycle, and a CCTV disposed on a street.

The electronic device 100 trains the object recognition model by using the input image as training data at operation S1520. In this case, the electronic device 100 may train the object recognition model to recognize an object (for example, a car, a traffic light, a sign, a sign board, school, or the like) included in the inputted image. The electronic device 100 may input the object and the image to a road information recognition model as training data at operation S1530.

The electronic device 100 may train the road information recognition model by using the object and the image as training data at operation S1540. Specifically, the electronic device 100 may input the object and the image to the road information recognition model, and may train the road information recognition model to determine a relationship between objects in the image or a context of an object and to obtain road information (for example, arrangement information of the object, movement information of the object, blind spot information included in the road, and state information of the road).

The electronic device 100 may input the road information and region information to a danger object recognition model as training data at operation S1550.

The electronic device 100 may train the danger object recognition model by using the road information and the region information as training data at operation S1560. Specifically, the electronic device 100 may determine whether a virtual danger object will appear by inputting the road information and the region information to the danger object recognition model as training data, and may train the danger object recognition model to obtain information regarding an object which may appear.

In particular, the electronic device 100 may use various recognition models such as DNN, RNN, BRDNN, or the like to train the above-described recognition models.

In the above-described embodiments, the object recognition model, the road information recognition model, and the danger object recognition model are trained. However, only one or two of the three models may be trained. Specifically, the road information recognition model may be trained to obtain road information by using an image as training data, and the danger object recognition model may be trained to obtain information regarding a virtual danger object by using an image and region information as training data.

FIGS. 16, 17, 18 and 19 are flowcharts of a network system using a recognition model according to various embodiments of the disclosure.

Referring to FIGS. 16, 17, 18 and 19, the network system using the recognition model may include a first element 1601, 1701, 1801, 1901 and a second element 1602, 1702, 1802, 1902.

Herein, the first element 1601, 1701, 1801, 1901 may be the electronic device 100, and the second element 1602, 1702, 1802, 1902 may be a server S in which a recognition model is stored. Alternatively, the first element 1601, 1701, 1801, 1901 may be a generic-purpose processor, and the second element 1602, 1702, 1802, 1902 may be an AI-dedicated processor. Alternatively, the first element 1601, 1701, 1801, 1901 may be at least one application, and the second element 1602, 1702, 1802, 1902 may be an operating system (OS). That is, the second element 1602, 1702, 1802, 1902 may be more integrated or dedicated than the first element 1601, 1701, 1801, 1901, and may less delay, may have better performance, or may more resources than in the first element 1601, 1701, 1801, 1901, and may process many operations required to generate, refine, or apply a data recognition model more rapidly and more effectively than the first element 1601, 1701, 1801, 1901.

In this case, an interface for transmitting/receiving data between the first element 1601, 1701, 1801, 1901 and the second element 1602, 1702, 1802, 1902 may be defined.

For example, an application program interface (API) having training data to be applied to a recognition model as a factor value (or a parameter value or a transfer value) may be defined. The API may be defined as a set of sub routines or functions which is called by a certain protocol (for example, a protocol defined in the electronic device 100) for a certain process in another protocol (for example, a protocol defined in the server S). That is, an environment in which a certain protocol performs an operation of another protocol may be provided through the API.

Figure 16:
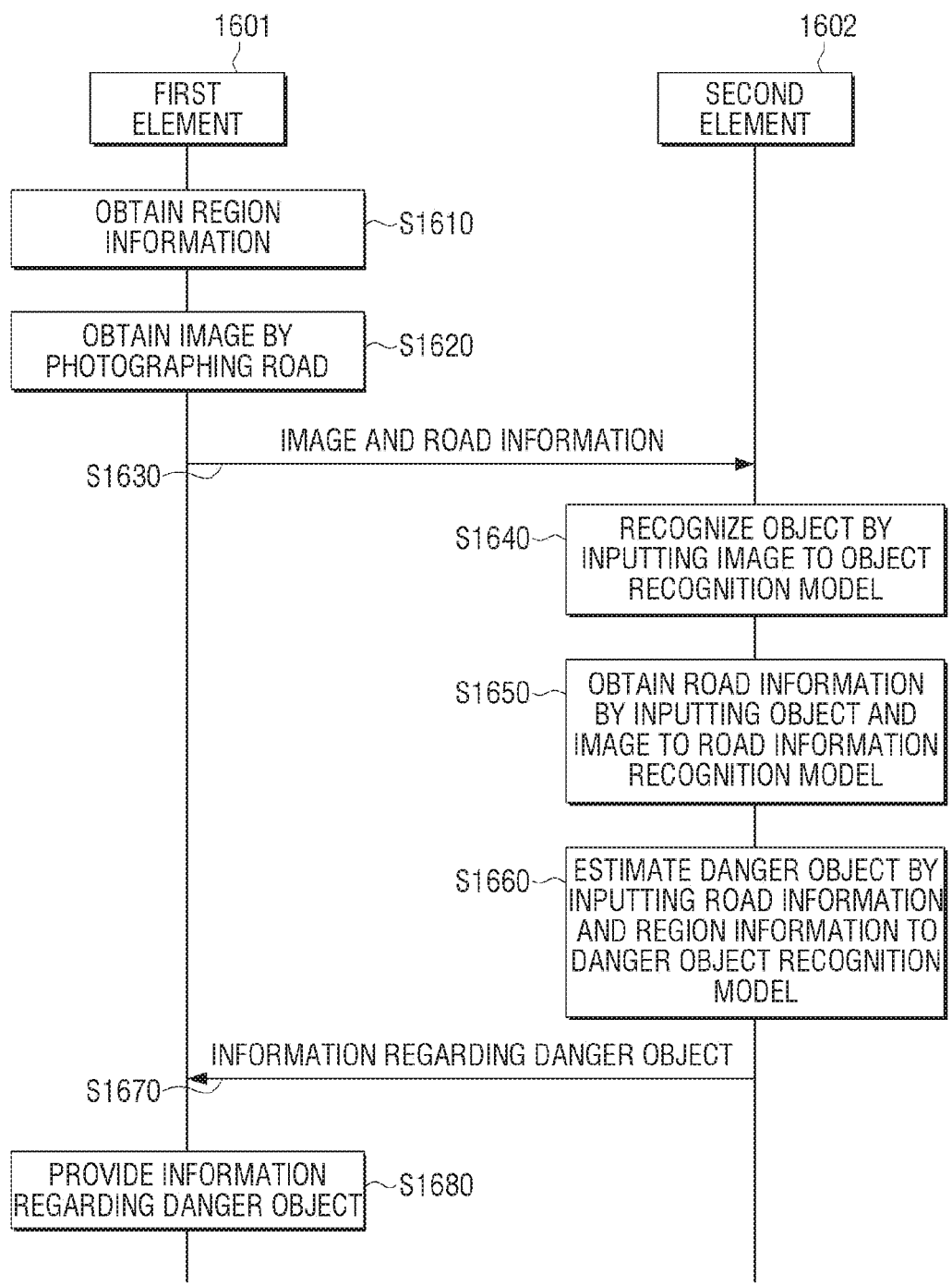
FIGS. 16, 17, 18 and 19 are flowcharts of a network system using a recognition model according to various embodiments of the disclosure.

In an embodiment in FIG. 16, the first element 1601 may obtain region information at operation S1610. In this case, the region information may be information regarding a region in which a vehicle including the first element 1601 is located, or a region on the periphery of a path of the vehicle.

The first element 1601 may obtain an image by photographing a road by using a camera at operation S1620.

The first element 1601 may transmit the obtained image and road information to the second element 1602 at operation S1630.

The second element 1602 may recognize an object by inputting the image to an object recognition model at operation S1640. In this case, the second element 1602 may obtain information regarding the object.

In addition, the second element 1602 may obtain road information by inputting the recognized object and the image to a road information recognition model at operation S1650. In this case, the road information may be arrangement information of the object, movement information of the object, blind spot information included in the road, and state information of the road.

In addition, the second element 1602 may estimate a danger object by inputting the road information and the region information to a danger object recognition model at operation S1660. When a probability that the danger object appears is higher than a predetermined value, the second element 1602 may obtain information regarding a virtual danger object.

The second element 1602 may transmit the information regarding the danger object to the first element 1601 at operation S1670.

The first element 1601 may provide the information regarding the danger object at operation S1680. In this case, the first element 1601 may provide the information of the danger object in at least one form of visual feedback, acoustic feed, and haptic feedback.

Figure 17:
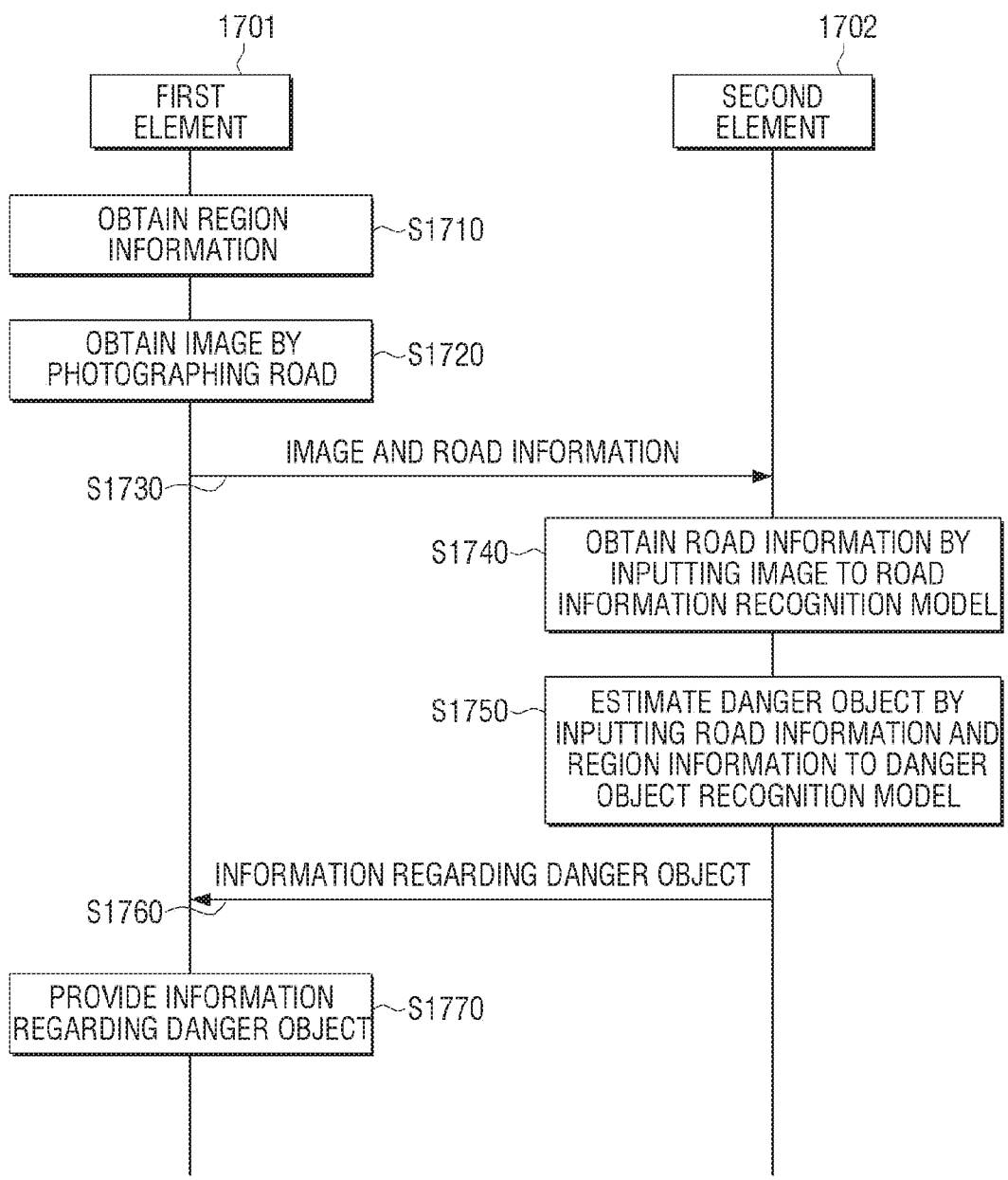

In another embodiment in FIG. 17, the first element 1701 may obtain region information at operation S1710. In this case, the region information may be information regarding a region in which a vehicle including the first element 1701 is located, or a region on the periphery of a path of the vehicle.

The first element 1701 may obtain an image by photographing a road by using a camera at operation S1720.

The first element 1701 may transmit the obtained image and road information to the second element 1702 at operation S1730.

The second element 1702 may obtain road information by inputting the image to a road information recognition model at operation S1740. In this case, the road information recognition model may be a recognition model which is trained to recognize an object included in the image by using the image as input data, and to recognize a relationship with the recognized object or a context of the recognized object. That is, the second element 1702 may obtain the road information by directly inputting the image to the road information recognition model without inputting the image to a separate object recognition model.

In addition, the second element 1702 may estimate a danger object by inputting the road information and the region information to a danger object recognition model at operation S1750. The second element 1702 may transmit information regarding the danger object to the first element 1701 at operation S1760.

The first element 1701 may provide the information regarding the danger object at operation S1770. In this case, the first element 1701 may provide the information of the danger object in at least one form of visual feedback, acoustic feed, and haptic feedback.

Figure 18:
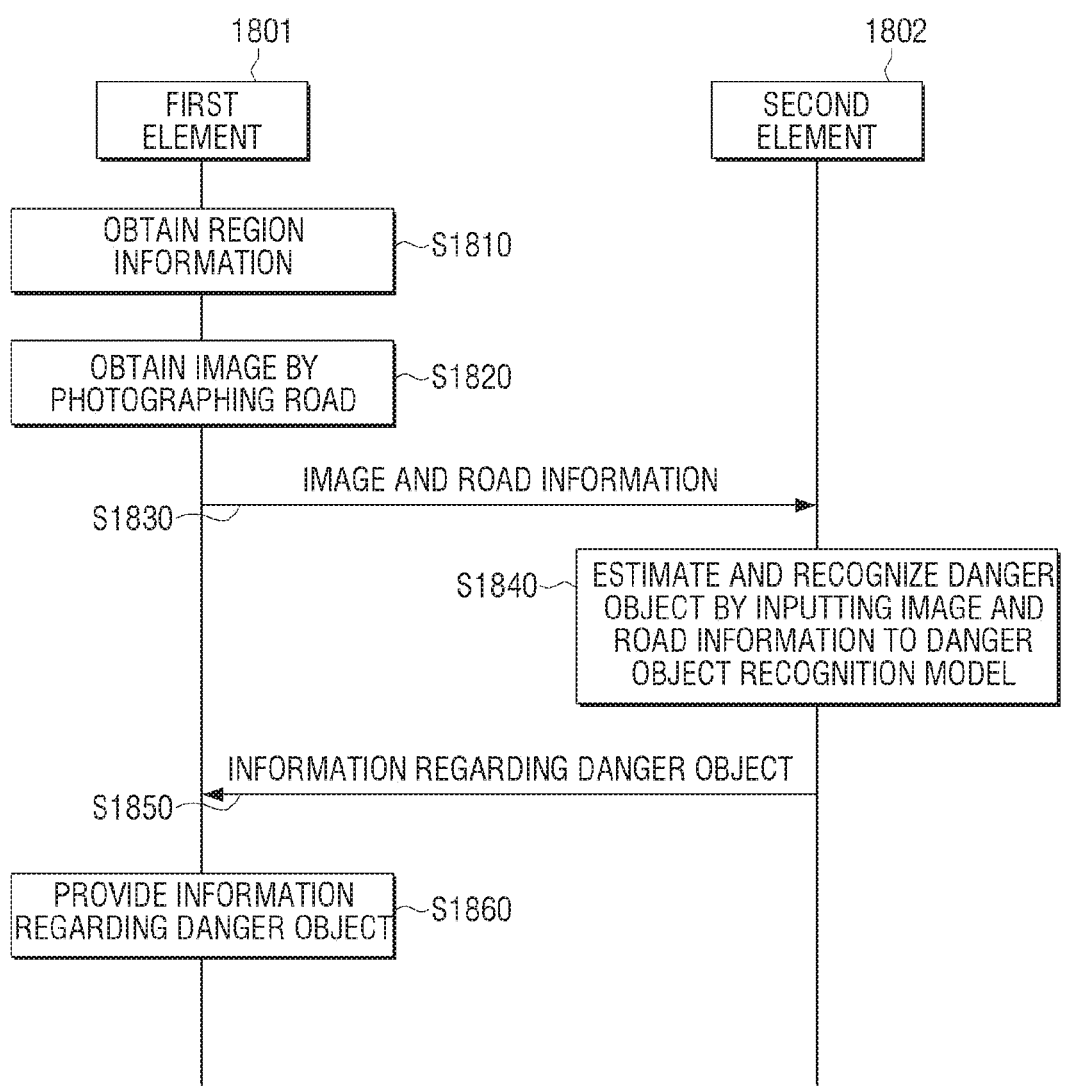

In another embodiment in FIG. 18, the first element 1801 may obtain region information at operation S1810. In this case, the region information may be information regarding a region in which a vehicle including the first element 1801 is located, or a region on the periphery of a path of the vehicle.

The first element 1801 may obtain an image by photographing a road by using a camera at operation S1820.

The first element 1801 may transmit the obtained image and road information to the second element 1802 at operation S1830.

The second element 1802 may estimate a danger object by inputting the image and the road information to a danger object recognition model at operation S1840. In this case, the danger object recognition model may be a model that is trained to recognize an object by using the image and the road information as input data, and to estimate a virtual danger object based on a relationship with the object, a context of the object, and the road information. Accordingly, the second element 1802 may estimate information regarding the danger object by directly inputting the image and the road information to the danger object recognition model, without passing through a separate object recognition model or road information recognition model.

The second element 1802 may transmit the information regarding the danger object to the first element 1801 at operation S1850.

The first element 1801 may provide the information regarding the danger object (at operation S1860). In this case, the first element 1801 may provide the information of the danger object in at least one form of visual feedback, acoustic feed, and haptic feedback.

Figure 19:
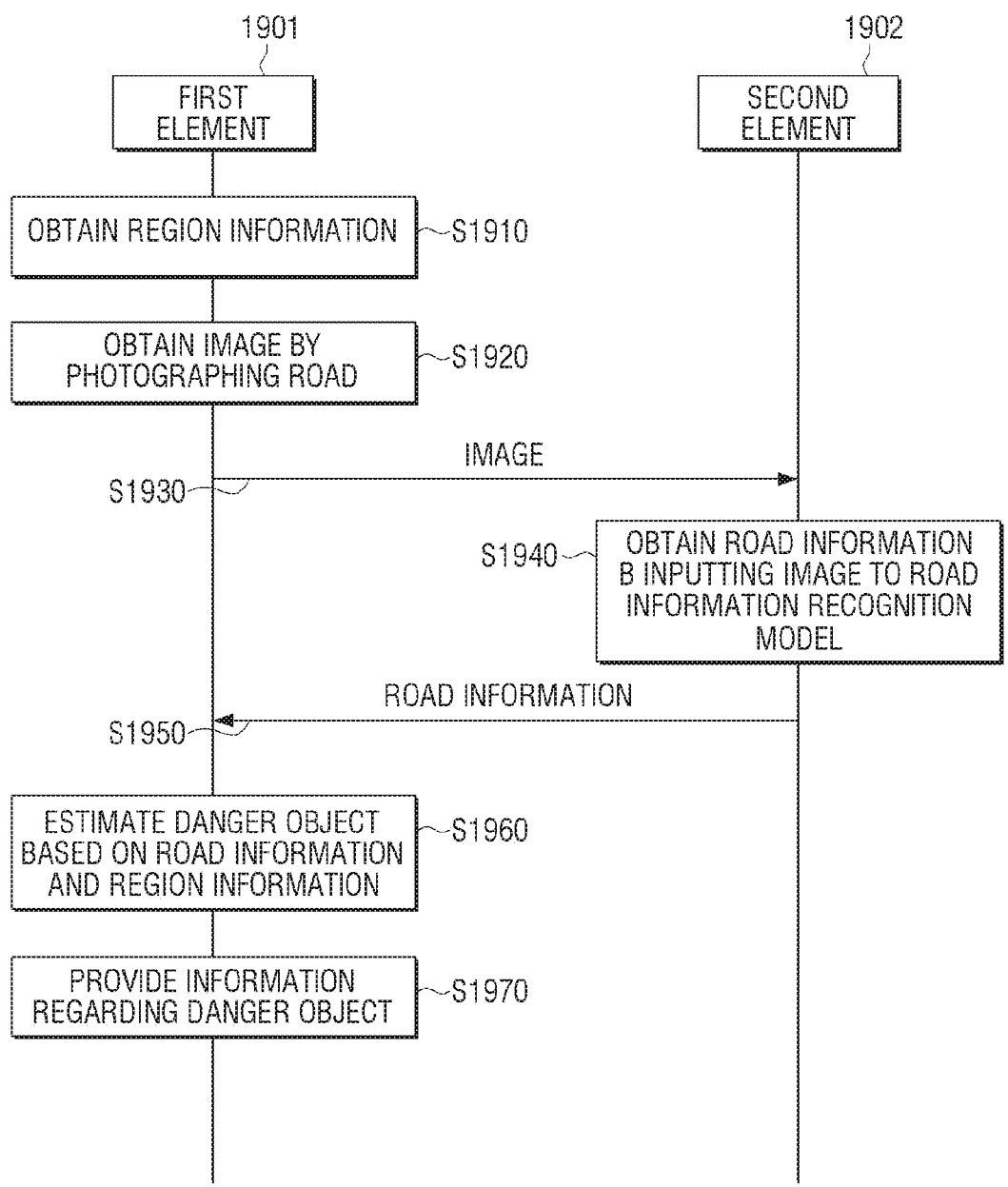

In another embodiment in FIG. 19, the first element 1901 may obtain region information at operation S1910. In this case, the region information may be information regarding a region in which a vehicle including the first element 1901 is located, or a region on the periphery of a path of the vehicle.

The first element 1901 may obtain an image by photographing a road by using a camera at operation S1920.

The first element 1901 may transmit the obtained image to the second element 1902 at operation S1930.

The second element 1902 may obtain road information by inputting the received image to a road information recognition model at operation S1940. In this case, the road information recognition model may be a recognition model which is trained to recognize an object included in the image by using the image as input data, and to recognize a relationship with the recognized object or to recognize a context of the recognized object.

The second element 1902 may transmit the road information to the first element 1901 at operation S1950.

The first element 1901 may estimate a danger object based on the road information and the region information at operation S1960. Specifically, the first element 1901 may predict a possibility that the danger object appears by using the danger object evaluation module 340, and may obtain information regarding the danger object.

The first element 1901 may provide the information regarding the danger object at operation S1970. In this case, the first element 1901 may provide the information of the danger object in at least one form of visual feedback, acoustic feed, and haptic feedback.

As used herein, the term "module" may be implemented as software, but this is merely an example, and the "module" may include a unit implemented in hardware, software, or firmware. For example, the "module" may interchangeably be used with other terms, for example, "logic," "logic block," "part," or "circuitry." A module may be a single integral component, or a minimum unit or part thereof, adapted to perform one or more functions. For example, the module may be implemented in a form of an application-specific integrated circuit (ASIC).

Various embodiments as set forth herein may be implemented as software including instructions that are stored in a storage medium (machine-readable storage media) that is readable by a machine (for example, a computer). For example, the machine may invoke an instruction stored in the storage medium, and may operate according to the invoked instruction, and may include an electronic device (for example, an electronic device A) according to embodiments. When the instruction is executed by a processor, the processor may perform a function corresponding to the instruction directly or using other elements under control of the processor. The instruction may include a code generated by a complier or a code executable by an interpreter. The machine-readable storage medium may be provided in the form of a non-transitory storage medium. Wherein, the term "non-transitory" simply means that the storage medium is a tangible device, and does not include a signal, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed online via an application store (e.g., Play Store™). If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described sub components may be omitted, or one or more other sub components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown described with reference to various embodiments thereof, it will be understood by those skilled in the art that various changes in form and details may be made therein without departing from the spirit and scope of the disclosure as defined by the appended claims and their equivalents.

What is claimed is:

1. A method for controlling an electronic device provided in a vehicle, the method comprising:
    obtaining region information regarding a region located on a path of the vehicle, the region information comprising information regarding traffic accidents occurred in the region;
    obtaining an image by photographing a road on which the vehicle travels, through a camera;
    obtaining road information regarding the road on which the vehicle travels based on at least one object included in the obtained image, the road information comprising information regarding at least one blind spot included the road;
    obtaining information regarding a virtual danger object which is likely to appear on the road on which the vehicle travels from the at least one blind spot, based on the road information and the region information, the virtual danger object being different from all of the at least one object included in the obtained image; and
    providing the information regarding the virtual danger object,
    wherein the obtaining of the information regarding the virtual danger object is based on a probability of an appearance of the virtual danger object on the road.

2. The method of claim 1, wherein the obtaining of the road information comprises:
    obtaining at least one of arrangement information of an object included in the road on which the vehicle travels, movement information of the object, blind spot information included in the road, or state information of the road, by inputting the image to a recognition model which is trained to estimate the road information.

3. The method of claim 1, wherein the region information comprises:
    at least one of demographic information of the region, information regarding schools, including private educational institutes, in the region, information regarding traffic accidents having occurred in the region, or information regarding wildlife in the region.

4. The method of claim 1, wherein the information regarding the virtual danger object includes information that is obtained by applying the road information and the region information to a recognition model which is trained to estimate the virtual danger object.

5. The method of claim 4, wherein the information regarding the virtual danger object comprises:
    at least one of type information of the virtual danger object, information regarding a location where the virtual danger object will appear, or movement pattern information of the virtual danger object.

6. The method of claim 1, wherein the obtaining of the information regarding the virtual danger object comprises:
    obtaining the information regarding the virtual danger object by additionally using at least one of current time information or additional information regarding a similar road registered as being similar to the road.

7. The method of claim 1, further comprising:
    obtaining traffic guidance information regarding the road from a traffic guidance device located on the road on which the vehicle travels,
    wherein the obtaining the information regarding the virtual danger object comprises obtaining the information regarding the virtual danger object by additionally using the traffic guidance information.

8. The method of claim 1,
    wherein the electronic device stores history information regarding a user's driving habits, and
    wherein the obtaining the information regarding the virtual danger object comprises obtaining the information regarding the virtual danger object by additionally using the history information.

9. The method of claim 1, wherein the providing of the information comprises at least one of:
    outputting the information regarding the virtual danger object through a speaker provided in the vehicle, or
    displaying the virtual danger object through a display provided in the vehicle.

10. The method of claim 1, further comprising:
controlling driving of the vehicle based on the information of the virtual danger object.

11. An electronic device provided in a vehicle, the electronic device comprising:
a camera;
a transceiver;
at least one processor electrically connected with the camera and the transceiver; and
a memory electrically connected with the at least one processor,
wherein the at least one processor is configured to:
obtain region information regarding a region located on a path of the vehicle, the region information comprising information regarding traffic accidents occurred in the region, and store the region information in the memory;
obtain an image by photographing a road on which the vehicle travels, through a camera;
obtain road information regarding the road on which the vehicle travels based on at least one object included in the obtained image, the road information comprising information regarding at least one blind spot included the road;
obtain information regarding a virtual danger object which is likely to appear on the road on which the vehicle travels from the at least one blind spot, based on the road information and the region information, the virtual danger object being different from all of the at least one object included in the obtained image; and
provide the information regarding the virtual danger object to the vehicle,
wherein the obtaining of the information regarding the virtual danger object is based on a probability of an appearance of the virtual danger object on the road.

12. The electronic device of claim 11, wherein the at least one processor is further configured to:
obtain at least one of arrangement information of an object included in the road on which the vehicle travels, movement information of the object, blind spot information included in the road, or state information of the road, by inputting the image to a recognition model which is trained to estimate the road information.

13. The electronic device of claim 11, wherein the region information comprises:
at least one of demographic information of the region, information regarding schools, including private educational institutes, in the region, information regarding traffic accidents having occurred in the region, or information regarding wildlife appearance in the region.

14. The electronic device of claim 11, wherein the information regarding the virtual danger object includes information that is obtained by applying the road information and the region information to a recognition model which is trained to estimate a danger object.

15. The electronic device of claim 14, wherein the information regarding the virtual danger object comprises:
at least one of type information of the virtual danger object, information regarding a location where the virtual danger object will appear, or movement pattern information of the virtual danger object.

16. The electronic device of claim 11, wherein the at least one processor is further configured to:
obtain the information regarding the virtual danger object by additionally using at least one of current time information or additional information regarding a similar road registered as being similar to the road.

17. The electronic device of claim 11, wherein the at least one processor is further configured to:
receive, through the transceiver, traffic guidance information regarding the road from a traffic guidance device located on the road on which the vehicle travels, and
obtain the information regarding the virtual danger object by additionally using the traffic guidance information.

18. The electronic device of claim 11,
wherein the memory is configured to store history information regarding a user's driving habits, and
wherein the at least one processor is further configured to obtain the information regarding the virtual danger object by additionally using the history information.

19. The electronic device of claim 11, wherein the at least one processor is further configured to at least one of:
output a control command to the vehicle to output the information regarding the virtual danger object through a speaker provided in the vehicle, or
display the virtual danger object through a display provided in the vehicle.

20. An electronic device provided in a vehicle, the electronic device comprising:
a camera;
a transceiver;
at least one processor electrically connected with the camera and the transceiver; and
a memory electrically connected with the at least one processor,
wherein the memory is configured to store:
a road information recognition model which is trained to estimate road information by using an image obtained by the camera, and
a danger object recognition model which is trained to estimate a virtual danger object by using road information and region information,
wherein the at least one processor is configured to:
obtain region information regarding a region located a path of the vehicle, the region information comprising information regarding traffic accidents occurred in the region, and store the region information in the memory,
obtain the image by photographing a road on which the vehicle travels, through the camera,
obtain the road information regarding the road on which the vehicle travels based on at least one object included in the obtained image to the road information recognition model, the road information comprising information regarding at least one blind spot included the road,
obtain information regarding the virtual danger object which is likely to appear on the road on which the vehicle travels from the at least one blind spot based on the road information and the region information to the virtual danger object recognition model, the virtual danger object being different from all of the at least one object included in the obtained image, and
provide the information regarding the virtual danger object to the vehicle,
wherein the obtaining of the information regarding the virtual danger object is based on a probability of an appearance of the virtual danger object on the road.

* * * * *